(12) United States Patent
Palmer et al.

(10) Patent No.: US 12,449,250 B2
(45) Date of Patent: Oct. 21, 2025

(54) PROVOKING MOVEMENT OF COMPUTING DEVICES WITH AUGMENTED REALITY FEATURES

(71) Applicant: LexisNexis Risk Solutions FL Inc., Boca Raton, FL (US)

(72) Inventors: Victor Palmer, Denver, CO (US); Angel Ai Jun Lam, Denver, CO (US)

(73) Assignee: LexisNexis Risk Solutions FL Inc., Boca Raton, FL (US)

( * ) Notice: Subject to any disclaimer, the term of this patent is extended or adjusted under 35 U.S.C. 154(b) by 138 days.

(21) Appl. No.: 18/063,860

(22) Filed: Dec. 9, 2022

(65) Prior Publication Data

US 2023/0184537 A1    Jun. 15, 2023

Related U.S. Application Data

(60) Provisional application No. 63/288,372, filed on Dec. 10, 2021.

(51) Int. Cl.
| | | |
|---|---|---|
| *G01B 11/02* | (2006.01) | |
| *G01C 19/00* | (2013.01) | |
| *G01P 15/18* | (2013.01) | |
| *G06T 19/00* | (2011.01) | |

(52) U.S. Cl.
CPC ............. *G01B 11/02* (2013.01); *G01C 19/00* (2013.01); *G01P 15/18* (2013.01); *G06T 19/006* (2013.01); *G06T 2200/24* (2013.01)

(58) Field of Classification Search
CPC ................................................... G06T 19/006
See application file for complete search history.

(56) References Cited

U.S. PATENT DOCUMENTS

| | | | |
|---|---|---|---|
| 9,934,608 | B2 | 4/2018 | Castillo et al. |
| 10,346,999 | B2 | 7/2019 | Wexler et al. |
| 11,228,704 | B2 * | 1/2022 | Varekamp ............ H04N 23/633 |
| 11,507,713 | B2 | 11/2022 | Tran |
| 2020/0143565 | A1 * | 5/2020 | Festa ...................... G06T 19/006 |
| 2020/0401803 | A1 * | 12/2020 | Gilbert .................... G06T 11/60 |
| 2021/0390765 | A1 * | 12/2021 | Laaksonen ............ G06T 19/006 |
| 2022/0114298 | A1 | 4/2022 | Palmer et al. |
| 2022/0130064 | A1 * | 4/2022 | Tomar ................... G06T 19/006 |

* cited by examiner

*Primary Examiner* — Jayanti K Patel
*Assistant Examiner* — Christopher Kingsbury Glover
(74) *Attorney, Agent, or Firm* — TROUTMAN PEPPER LOCKE LLP; James E. Schutz; Mark Lehi Jones

(57) ABSTRACT

Systems and methods are disclosed with associated techniques for ensuring that structures are fully imaged, which may permit individuals to utilize mobile computing devices to record imagery of structures for the purpose of documenting their presence, size, location, and the like. As digital images are captured by a computing device, those digital images may be presented in the form of a video feed on a display of the computing device. One or more digital elements can then be overlaid on the video feed. To incentivize a user to move the computing device in a predetermined manner by guided live feedback, the appearance of these digital elements may be manipulated based on movements of the computing device.

19 Claims, 13 Drawing Sheets

PROVOKING MOVEMENT OF COMPUTING DEVICES WITH AUGMENTED REALITY FEATURES

CROSS-REFERENCE TO RELATED APPLICATIONS

This application claims priority to U.S. Provisional Patent Application Ser. No. 63/288,372, filed on 10 Dec. 2021, the contents of which is hereby incorporated by reference in their entirety as if presented herein in full.

This application is also related to the following U.S. Patent Applications, which are incorporated by reference herein as if presented in full: U.S. patent application Ser. No. 17/401,912 filed 13 Aug. 2021, entitled "Semi-Supervised Layout Estimation of Interior Spaces from Panorama Images," and issued as U.S. Pat. No. 11,507,713 on Nov. 22, 2022, and U.S. patent application Ser. No. 17/500,128, filed 13 Oct. 2021, entitled "Generating measurement of Physical Structures and Environments through Automated Analysis of Sensor Data," and published as U.S. Patent Application Publication US20220114298 on 14 Apr. 2022.

TECHNICAL FIELD

Various embodiments of the disclosed technology relate to physical space modeling, and in particular, to systems and methods for facilitating a guided movement for capturing and generating digital images with live feedback using an inspection platform that is executing on a computing device.

BACKGROUND

Traditionally, dimensions of physical structures and environments have been measured using conventional measuring implements such as tape measures, yard sticks, rulers, and the like. These conventional measuring implements are useful for measuring the linear distance between a first location and a second location in Euclidean space (e.g., along a plane) along a straight line. However, there are notable downsides to using these conventional measuring implements when portions of the physical structure or environment being measured are curved, occluded, or occupied. Furthermore, the accuracy of such measurements can be inconsistent due to the reliance on the attention to detail and the skill level of the person(s) using the implement.

There have been several attempts to address these downsides through the development of computer programs that can be executed by mobile computing devices to capture images and extract measurement and other data from the images. U.S. Pat. No. 10,346,999, for example describes an image measurement technique the requires a user to place ancillary objects and reference objects in an imaged scene for determining pixel scale factors for measuring target object dimensions. The use of such ancillary and reference objects in the image creates a cumbersome and inconvenient process for the user to capture information in an imaged scene.

Other previous approaches using mobile computing devices to capture images and extract measurement and other data from the images have involved mobile apps that prompt the user to orient the camera of a mobile computing device toward an object to be measured, and then require the user to interact with a digital image generated by the camera to indicate the bounds of the object. Another approach requires that the user provide a reference measurement for another object contained in a digital image generated by the camera.

Computer programs and applications such as these are much more convenient than conventional implements as they are readily downloadable by anyone with a computing device. However, there still tends to be a large amount of inconsistency that results in incorrect measurements or user error. Much of this inconsistency is due to the degree to which users are still involved in the measurement process. For example, a user may imprecisely indicate the bounds of an object to be measured, or a user may input an incorrect reference measurement by mistake.

A need exists for more convenient, robust, and accurate systems and method for using mobile computing devices to capture images and extract measurement and other data from the images.

BRIEF SUMMARY

Embodiments of the disclosed technology include systems and methods for facilitating a guided movement with live feedback for capturing digital images using an augmented reality (AR) framework executing on a computing device.

In accordance with certain exemplary implementations of the disclosed technology, a method is provided that includes receiving, at a computing device, a first input that represents a request to image a structure. The computing device includes a camera configured to automatically capture digital images, a display configured to output the digital images as a video feed, one or more position sensors; and an augmented reality (AR) framework executed by the computing device and in communication with the one or more position sensors and the camera. The method includes capturing, with the camera, digital images of the structure, outputting, at the display, the captured digital images in the form a video feed, overlaying, at the display, a digital feature on the video feed, manipulating, based on spatial information output by the AR framework, an appearance of the digital feature to visually prompt a user to move the computing device as the digital images are being captured, and automatically extracting and outputting one or more measurements of the structure.

In accordance with certain exemplary implementations of the disclosed technology, a system is provided that includes a computing device having a processor, memory in communication with the processor, a camera configured to automatically capture digital images and store them in the memory, a display configured to output the digital images as a video feed, one or more position sensors, and an augmented reality (AR) framework executed by the computing device and in communication with the one or more position sensors and the camera. The computing device is configured to receive a first input that represents a request to image a structure, capture, with the camera, digital images of the structure, output, at the display, the captured digital images in the form a video feed, overlay, at the display, a digital feature on the video feed, manipulate, based on spatial information output by the AR framework, an appearance of the digital feature to visually prompt a user to move the computing device as the digital images are being captured, and automatically extract and output one or more measurements of the structure.

Certain exemplary implementations of the disclosed technology include a non-transitory medium with instructions stored thereon that, when executed by a processor of a computing device, cause the computing device to perform operations including receiving, at a computing device, a first input that represents a request to image a structure. The computing device includes a camera configured to automatically capture digital images, a display configured to output the digital images as a video feed, one or more position sensors; and an augmented reality (AR) framework executed by the computing device and in communication with the one or more position sensors and the camera. The method includes capturing, with the camera, digital images of the structure, outputting, at the display, the captured digital images in the form a video feed, overlaying, at the display, a digital feature on the video feed, manipulating, based on spatial information output by the AR framework, an appearance of the digital feature to visually prompt a user to move the computing device as the digital images are being captured, and automatically extracting and outputting one or more measurements of the structure.

Other implementations, features, and aspects of the disclosed technology are described in detail herein and are considered a part of the claimed disclosed technology. Other implementations, features, and aspects can be understood with reference to the following detailed description, accompanying drawings, and claims.

BRIEF DESCRIPTION OF THE DRAWINGS

Reference will now be made to the accompanying figures and flow diagrams, which are not necessarily drawn to scale.

Figure 1:
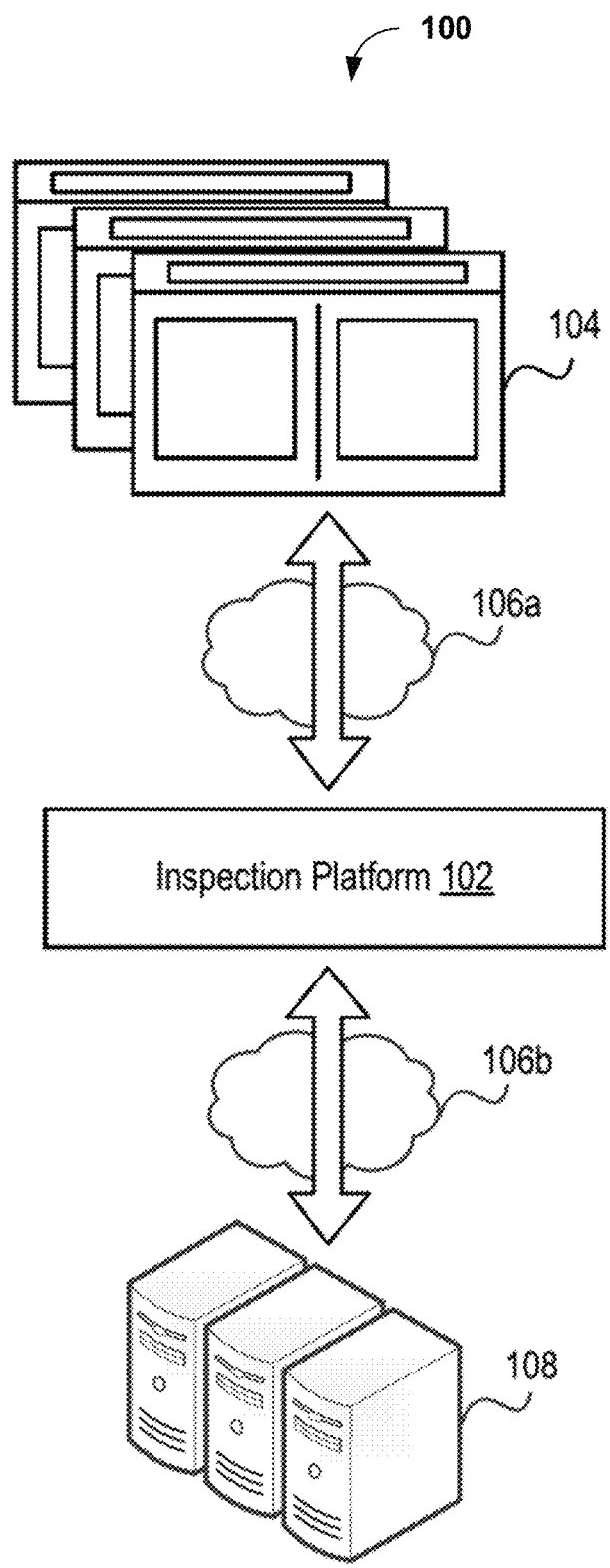
FIG. 1 illustrates a network environment 100 that includes an inspection platform, in accordance with an exemplary implementation of the disclosed technology.

Various features of the technology described herein will become more apparent to those skilled in the art from a study of the Detailed Description in conjunction with the drawings. Various embodiments are depicted in the drawings for the purpose of illustration. However, those skilled in the art will recognize that alternative embodiments may be employed without departing from the principles of the technology. Accordingly, although specific embodiments are shown in the drawings, the technology is amenable to various modifications.

DETAILED DESCRIPTION

The disclosed technology includes systems and methods that enable an improved extraction of dimensions and related features of physical structures (for example, interior spaces, contents, buildings, etc.,) by providing live feedback to a user for capturing various different views of the structure with the aid of spatial information that is output by an augmented reality framework (also called an "AR framework") on the computing device used for imaging the associated scene. The term "interior space" may refer to a physical space that is enclosed by a floor, ceiling, and walls. An interior space need not be completely bounded by walls on all sides, as the disclosed technology can be applied to interior spaces that are partially or fully enclosed by walls.

In certain exemplary implementations, the AR framework may be provided by a commercially available AR engine that may execute on a computing device and may perform visual inertial odometry using the computing device camera, processors, and motion/location sensors to track the surroundings and/or to sense how the computing device is moved around a space. Examples of currently available AR frameworks that may be utilized in conjunction with the disclosed technology are as discussed in the Apple Developer ARKit documentation (https://developer.apple.com/documentation/arkit/), or in the Google ARCore documentation (https://developers.google.com/ar/develop), each of which are incorporated herein by reference as if presented in full.

The disclosed technology includes methods that can be implemented via computer program instructions executing on a computing device. For example, the instructions may cause the computing device to receive input that represents a request to establish the dimensions of a structure in an interior space. Such input can correspond to a user either initiating (i.e., opening) the computer program or interacting with the computer program in such a manner so as to initiate measuring the structure. Responsive to the received input to initiate measuring, the computer program can then invoke an AR framework that is executable by the computing device.

The AR framework may be executed "in the background" by the operating system of the computing device, and thus may not be executed by the computer program itself. Instead, the computer program may acquire spatial information from the AR framework when needed. For example, the ARWorldTrackingConfiguration class of the ARKit may be invoked to track the computing device movement with six degrees of freedom the three rotation axes (roll, pitch, and yaw), and three translation axes (movement in x, y, and z). The ARPositionalTrackingConfiguration class of the ARKit can enable 6 degrees of freedom tracking of the computing device by running the camera at lowest possible resolution and frame rate Such device tracking information may be made available to the computer program executing on the computing device and may be utilized by the disclosed technology to detect the position of the computing device and (associated camera) while images are captured by the camera. Such device tracking and/or position information may be utilized to select and/or vary the appearance of an overlay on the computing device's display as a form of guided live feedback to instruct the user to move the computing device/camera in a particular pattern so that multiple different views of the scene and/or structure may be imaged, for example, to provide additional or enhanced information regarding structures or objects in the digital images. In certain implementation, the movement of the camera and processing of the digital images may provide a "synthetic parallax" which can be used to extract depth information about structures or objects in the digital images. In certain exemplary implementations, this enhanced information regarding structures or objects in the digital images may be used for many different purposes, including but not limited to structural measurements, object measurements, object recognition, detection of objects, detection of a condition of objects, safety hazards, etc.

As part of the measurement process, the user may be prompted to position the computing device so that digital images of the structure can be generated. To measure the structure, the computer program may utilize and combine information derived through analysis of the digital images as discussed in U.S. application Ser. No. 17/500,128, titled "Generating Measurements of Physical Structures and Environments Through Automated Analysis of Sensor Data," filed 13 Oct. 2021, and published as U.S. Patent Application Publication US20220114298 on 14 Apr. 2022, the contents of which is hereby incorporated by reference in their entirety as if presented herein in full. More specifically, the computer program may enable or facilitate measurement of the structure based on (i) the digital images generated by the image sensor and (ii) measurements generated by an inertial sensor (also referred to as a "motion sensor"), which, as discussed above, may be This approach is advantageous since the digital images provide a visual representation of the structure up to an unknown scale factor, while the inertial measurements (also referred to as "motion measurements") provide an estimate of the unknown scale factor. Together, these data enable estimates of measurements of the structure.

Measurement accuracy can be improved if digital images are generated of the structure from multiple spatial positions, so that greater coverage of the structure is obtained. In an example scenario, a first digital image of a structure may be captured from a first spatial position and a second digital image of the structure may be captured from a second spatial position. Capturing the first and second digital images from different spatial positions may enable the computer program to estimate the measurements of the structure from different perspectives. Simply put, the first and second digital images provide more information about the structure (and interior space as a whole) than would multiple digital images captured from the same perspective. Capturing digital images from multiple perspectives may also enable other features. For example, a digital representation of the structure could be more easily created if the digital images captured more of its surface.

Having the user reposition the computing device is not a trivial task, however. When instructed to reposition a computing device, many users tend to either (i) reorient the computing device (e.g., from the vertical orientation to the horizontal orientation, or vice versa) or (ii) move the computing device along an axis that extends orthogonally from the roughly vertical plane along which the computing device is oriented. That is, users tend to position the computing device further or nearer their bodies, thereby changing the spatial position of the computing device without altering its perspective of the structure.

Situations can also exist where a user physically rotates their phone/camera without translating it. Such movement can deprive the AR engine of the desired "synthetic parallax" motion, and in certain instances, may negatively affect the data capture. Thus, in certain embodiments of the disclosed technology, the AR engine or framework may be used to determine whether or not the user is capturing images from multiple spatial positions that include lateral translation. Based on such determination, and in certain exemplary implementations, the overlay instructions and/or digital features may be generated/revised and displayed to prompt the user to move the image capture device in a more advantageous pattern, for example, that includes lateral, vertical, and/or horizontal translation to provide the "synthetic parallax" information in the images.

In accordance with certain exemplary implementations of the disclosed technology, and to gain greater coverage of the structure, the disclosed technology may be utilized prompt a user to move the computing device parallel to a vertical plane along which the computing device is oriented. This can be accomplished in several different ways as further discussed below. For example, digital images generated by the image sensor may be presented for display by the computing device in the form of a video feed. In such a scenario, a digital feature may be overlaid on the video feed. The digital feature may be responsive to movements along the vertical plane. Accordingly, if the user moves the computing device orthogonal to the vertical plane (e.g., further or nearer her body), then the digital feature may retain the same appearance. However, if the user moves the computing device parallel to the vertical plane, then the appearance of the digital feature may change. Variations in the appearance of the digital feature can be used to provoke the user into moving the computing device in a desired manner, as will be discussed below with respect to the illustrations of FIGS. 7A-10L.

Certain exemplary implementations of the disclosed technology may establish that the computing device was indeed repositioned. To accomplish this, for example, the computer program executing on the device may receive and examine spatial information generated by the AR framework. As digital images are generated by the image sensor, the digital images can be provided to the AR framework as input. The AR framework can produce, as output, spatial information that specifies spatial positions of the computing device with respect to a defined coordinate system. Accordingly, for each digital image, the computer program may obtain a spatial position of the computing device as determined by the AR framework. By monitoring the spatial positioned determined for the computing device over time, the computer program can establish whether the computing device is being repositioned.

For the purpose of illustration, embodiments may be described in the context of generating measurements for structures in interior spaces. Examples of structures include the floor, ceiling, and walls of the interior space, as well as obtained contained therein such as furniture. However, the approach described herein may also be suitable for improving the coverage of digital images of structures in exterior spaces. Generally, the term "interior space" is used to refer to a physical space inside a building of interest. The term "exterior space," meanwhile, may be used to refer to a physical space that is external to the building of interest. Examples of exterior spaces include driveways, decks, and the like.

Embodiments may also be described in the context of executable instructions for the purpose of illustration. However, those skilled in the art will recognize that aspects of the technology could be implemented via hardware, firmware, or software. As an example, a computer program that is representative of a software-implemented inspection platform (or simply "inspection platform") designed to facilitate imaging and measuring of interior spaces or exterior spaces may be executed by the processor of a computing device. This computer program may interface, directly or indirectly, with hardware, firmware, or other software implemented on the computing device.

Various example embodiments of the disclosed technology now will be described more fully hereinafter with reference to the accompanying drawings, in which some, but not all embodiments of the disclosure are shown. This technology may, however, be embodied in many different forms and should not be construed as limited to the implementations set forth herein; rather, these implementations are provided so that this disclosure will be thorough and complete, and will convey the scope of the disclosed technology to those skilled in the art.

FIG. 1 illustrates a network environment 100 that includes an inspection platform 102. Individuals (also referred to as "users") can interface with the inspection platform 102 via interfaces 104. An interface 104 may be referred to herein as a graphical user interfaces (GUI). For example, a user may be able to access an interface through which information regarding a structure can be input. For instance, the user may specify the name of an interior space whose dimensions are to be measured, or the user may provide information regarding the property (e.g., an address, number of occupants, construction materials, insurance provider) or its owner (e.g., name, insurance account number). As another example, a user may be able to access an interface through which feedback is provided as digital images of a structure are generated. These interfaces 104 may also permit users to view two-dimensional (2D) and three-dimensional (3D) representations of structures, as well as manage preferences. The term "user," as used herein, may refer to a homeowner, builder, business owner, assessor, insurance adjuster (also referred to as a "claims adjuster"), or another individual with an interest in generating measurements or other information related to a structure.

As shown in FIG. 1, the inspection platform 102 may reside in a network environment 100. Thus, the computing device on which the inspection platform 102 is implemented may be connected to one or more networks 106a-b. These networks 106a-b may be personal area networks (PANs), local area networks (LANs), wide area networks (WANs), metropolitan area networks (MANs), cellular networks, or the Internet. Additionally, or alternatively, the inspection platform 102 can be communicatively coupled to one or more computing devices over a short-range wireless connectivity technology, such as Bluetooth®, Near Field Communication (NFC), Wi-Fi® Direct (also referred to as "Wi-Fi P2P"), and the like.

The interfaces 104 may be accessible via a web browser, desktop application, mobile application, or over-the-top (OTT) application. For example, in order to complete the measurement operation further described below, a user may access an interface that is generated by a mobile application executing on a mobile phone. This interface may also be accessible via the web browser executing on the mobile phone. Accordingly, the interfaces 104 may be viewed on a mobile phone, a tablet computer, a wearable electronic device (e.g., a watch or fitness accessory), or a virtual or augmented reality system (e.g., a head-mounted display).

In some embodiments, at least some components of the inspection platform 102 are hosted locally. That is, part of the inspection platform 102 may reside on the computing device that is used to access the interfaces 104. For example, the inspection platform 102 may be embodied as a mobile application that is executable by a mobile phone. In certain exemplary implementations, the mobile application may be communicatively connected to a server system 108 on which other components of the inspection platform 102 are hosted.

In other embodiments, the inspection platform 102 may be executed entirely by a cloud computing service operated by, for example, Amazon Web Services®, Google Cloud Platform™, or Microsoft Azure®. In such embodiments, the inspection platform 102 may reside on a server system 108 that is comprised of one or more computer servers. These computer server(s) can include different types of data (e.g., spatial coordinates for interior spaces of interest, dimensions, digital images), algorithms for processing the data, building information (e.g., address, construction date, construction material, insurance provider), and other assets. Those skilled in the art will recognize that this information could also be distributed amongst the server system 108 and one or more computing devices. For example, some data that is generated by the computing device on which the inspection platform 102 resides may be stored on, and processed by, that computing device for security or privacy purposes.

Figure 2:
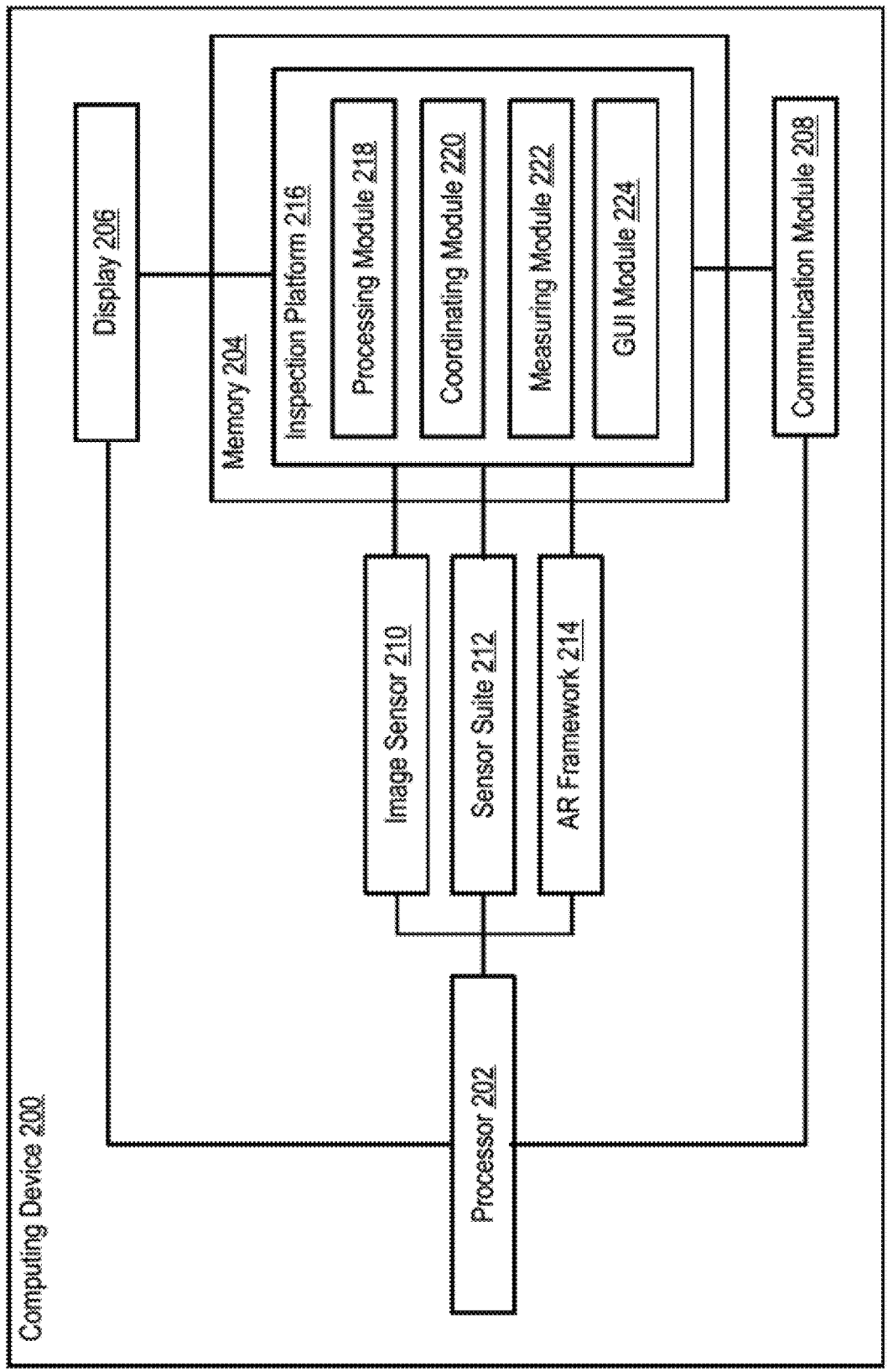
FIG. 2 illustrates an example of a computing device 200 that is configured to implement an inspection platform designed to generate measurements of a physical space and objects contained therein, in accordance with certain exemplary implementations of the disclosed technology.

FIG. 2 illustrates an example of a computing device 200 that is configured to implement an inspection platform 216 designed to generate measurements of a physical space and objects contained therein. The physical space could be an interior space or exterior space. The inspection platform 216 may generate the measurements based on an analysis of digital images of the physical space. As further discussed below, these digital images can be acquired during a guided measurement operation in which a user is prompted to reposition the computing device 200 through the use of digital elements.

The computing device 200 can include a processor 202, memory 204, display 206, communication module 208, image sensor 210 (such as a camera), and sensor suite 212. Each of these components is discussed in greater detail below. Those skilled in the art will recognize that different combinations of these components may be present depending on the nature of the computing device 200.

The processor 202 may have generic characteristics similar to general-purpose processors, or the processor 202 may be an application-specific integrated circuit (ASIC) that provides control functions to the computing device 200. As shown in FIG. 2, the processor 202 can be coupled to all components of the computing device 200, either directly or indirectly, for communication purposes.

The memory 204 may include of any suitable type of storage medium, such as static random-access memory (SRAM), dynamic random-access memory (DRAM), electrically erasable programmable read-only memory (EEPROM), flash memory, or registers. In addition to storing instructions that can be executed by the processor 202, the memory 204 can also store data generated by the processor 202 (e.g., when executing the modules of the inspection platform 216). The memory 204 may be abstract representation of a storage environment. The memory 204 may include actual memory integrated circuits (also referred to as "chips").

In accordance with certain exemplary implementations of the disclosed technology, the display 206 can be any mechanism that is operable to visually convey information to a user. For example, the display 206 may be a panel that includes light-emitting diodes (LEDs), organic LEDs, liquid crystal elements, or electrophoretic elements. In some embodiments, the display 206 may be touch sensitive. Thus, a user may be able to provide input to the inspection platform 216 by interacting with the display 206.

The communication module 208 may be responsible for managing communications between the components of the computing device 200, or the communication module 208 may be responsible for managing communications with other computing devices (e.g., server system 108 of FIG. 1). The communication module 208 may be wireless communication circuitry that is designed to establish communication channels with other computing devices. Examples of wireless communication circuitry include chips configured for Bluetooth, Wi-Fi, NFC, and the like.

The image sensor 210 may be any electronic sensor that is able to detect and convey information in order to generate digital images, generally in the form of image data or pixel data. Examples of image sensors include charge-coupled device (CCD) sensors and complementary metal-oxide semiconductor (CMOS) sensors. The image sensor 210 may be implemented in a camera module (or simply "camera") that is implemented in the computing device 200. In some embodiments, the image sensor 210 is one of multiple image sensors implemented in the computing device 200. For example, the image sensor 210 could be included in a front- or rear-facing camera on a mobile phone (or smartphone).

Other sensors may also be implemented in the computing device 200. Collectively, these sensors may be referred to as the "sensor suite" 212 of the computing device 200. For example, the computing device 200 may include a motion sensor whose output is indicative of motion of the computing device 200 as a whole. Examples of motion sensors include accelerometers and gyroscopes. In some embodiments, the motion sensor is implemented in an inertial measurement unit (IMU) that measures the force, angular rate, or orientation of the computing device 200. The IMU may accomplish this through the use of one or more accelerometers, one or more gyroscopes, one or more magnetometers, or any combination thereof. As another example, the computing device 200 may include a proximity sensor whose output is indicative of proximity of the computing device 200 to a nearest obstruction within the field of view of the proximity sensor. A proximity sensor may include, for example, an emitter that is able to emit infrared (IR) light and a detector that is able to detect reflected IR light that is returned toward the proximity sensor. These types of proximity sensors are sometimes called laser imaging, detection, and ranging (LiDAR) sensors. As another example, the computing device 200 may include an ambient light sensor whose output is indicative of the amount of light in the ambient environment.

The computing device 200 may also implement an AR framework 214. The AR framework 214 is normally executed by the operating system of the computing device 200 rather than any individual computer program executing on the computing device 200. The AR framework 214 may integrate (i) digital images that are generated by the image sensor 210 and (ii) outputs produced by one or more sensors included in the sensor suite 212 in order to determine the location of the computing device 200 in 3D space. At a high level, the AR framework 214 may perform motion tracking, scene capturing, and scene processing to establish the spatial position of the computing device 200 in real time. Generally, the AR framework 214 is accessible to computer programs executing on the computing device 200 via an application programming interface (API). Thus, the inspection platform 214 may be able to readily obtain spatial positions from the AR framework 214 via the API as further discussed below.

For convenience, the inspection platform 216 may be referred to as a computer program that resides within the memory 204. However, the inspection platform 214 could include software, firmware, or hardware that is implemented in, or accessible to, the computing device 200. In accordance with embodiments described herein, the inspection platform 216 may include a processing module 218, coordinating module 220, measuring module 222, and graphical user interface (GUI) module 224. Each of these modules can be an integral part of the inspection platform 216. Alternatively, these modules can be logically separate from the inspection platform 216 but operate "alongside" it. Together, these modules enable the inspection platform 216 to generate measurements of a physical space, as well as obtained contained therein, in an automated manner by guiding a user through a measurement operation.

In accordance with certain exemplary implementations of the disclosed technology, the processing module 218 may process data obtained by the inspection platform 216 into a format that is suitable for the other modules. For example, the processing module 218 may apply operations to digital images generated by the image sensor 210 in preparation for analysis by the other modules of the inspection platform 216. Thus, the processing module 218 may despeckle, denoise, or otherwise filter images that are generated by the image sensor 210. Additionally, or alternatively, the processing module 218 may adjust properties like contrast, saturation, and gain in order to improve the outputs produced by the other modules of the inspection platform 216.

The processing module 218 may also process data obtained from the sensor suite 212 in preparation for analysis by the other modules of the inspection platform 216. As further discussed below, the inspection platform 216 may utilize data that is generated by a motion sensor in order to better understand data that is generated by the image sensor 210. For example, the inspection platform 216 may programmatically combine digital images generated by the image sensor 210 based on measurements generated by the motion sensor, so as to create a panorama of the physical space. Moreover, the inspection platform 216 may determine, based on the measurements, an approximate location of each digital image generated by the image sensor 210 and then use those insights to establish dimensions of the physical space and objects contained therein. Alternatively, the inspection platform 216 may infer, based on the measurements, movements of the computing device 200 as digital images are generated by the image sensor 210. For example, the inspection platform 216 may be able to determine a direction and magnitude of movements of the computing device 200 based on an analysis of the measurements. To accomplish this, the measurements generated by the motion sensor may be temporally aligned with the digital images generated by the image sensor 210. The processing module 218 may be responsible for ensuring that these data are temporally aligned with one another, such that the inspection platform 216 can readily identify the measurement(s) that correspond to each digital image.

The coordinating module 220 may be responsible for determining and/or cataloguing the locations of points of interest. In an example implementation, a user may be interested in establishing the dimensions of a physical space. The periphery of the physical space may be defined by junctures. The term "juncture" may refer to any location where a pair of walls join, intersect, or otherwise merge or converge with one another. The term "juncture" as used herein is intended to cover corners where the walls form acute, obtuse, or reflex angles (a reflex angle is defined as an angle whose measure is greater than 180° but less than 360°). Therefore, the teachings of the disclosed technology may be applicable to structures regardless of their particular configuration. In order to "map" the periphery of the physical space, the inspection platform 216 may request that the user locate the computing device 200 in a certain position (e.g., proximate the center of the physical space) and then capture a panorama of the physical space by panning the computing device 200. The coordinating module 220 may be responsible for determining, based on an analysis of the panorama, where the junctures of the physical space are located. As further discussed below, this can be accomplished by applying a trained model to the panorama. The trained model may produce, as output, coordinates indicating where a juncture is believed to be located based on pixel-level examination of the panorama. The trained model may produce a series of outputs that are representative of different junctures of the physical space. Using the series of outputs, the coordinating module 220 can "reconstruct" the physical space, thereby establishing its dimensions.

The measuring module 222 may be utilized to examine the locations of junctures determined by the coordinating module 220 in order to derive information about the physical space being imaged. For example, the measuring module 222 may calculate a dimension of the physical space based on a comparison of multiple locations (e.g., a width defined by a pair of wall-wall boundaries, or a height defined by the floor-wall and ceiling-wall boundaries). As another example, the measuring module 222 may generate a 2D or 3D layout using the locations. Thus, the measuring module 222 may be able to construct a 2D or 3D model of the physical space based on the information gained through analysis of a single panorama. In some embodiments, the measuring module 222 is also responsible for cataloging the locations of junctures determined by the coordinating module 220. Thus, the measuring module 222 may store the locations in a data structure that is associated with either the physical space or a building with which the physical space is associated. Information derived by the measuring module 222, such as dimensions and layouts, can also be stored in the data structure. In some embodiments each location is represented using a coordinate system (e.g., a geographic coordinate system such as the Global Positioning System) that is associated with real-world positions, while in other embodiments each location is represented using a coordinate system that is associated with the surrounding environment. For example, the location of each juncture may be defined with respect to the location of the computing device 200.

As mentioned above, generating digital images of the physical space in its entirety—or at least the portion to be measured—can help ensure that the information derived by the measuring module 222 is accurate. To ensure that this occurs, the inspection platform 216 can prompt the user to move the computing device in a particular manner as digital images are generated during the measurement operation. The computing device 200, for example, may be positioned in either the vertical or horizontal orientation with a vertical plane defined therethrough. In such a scenario, the inspection platform 216 may prompt the user to move the computing device along the vertical plane, for example, in a shape that is dictated by a digital element presented on the display 206.

In accordance with certain exemplary implementations of the disclosed technology, as digital images are generated by the image sensor 210 over the course of the measurement operation, those digital images may be presented on the display 206 in the form of a video feed. To provoke the user to move the computing device 200, the GUI module 224 may cause a digital feature to be overlaid on the video feed. At a high level, the digital feature may be representative of an augmented reality component that is intended to provoke the user into moving the computing device 200 in a predetermined manner via live feedback.

As further discussed below, the digital feature may be responsive to movements along the vertical plane. In some embodiments, movements of the computing device 200 may be inferred based on an analysis of measurements generated by a sensor included in the sensor suite 212. For example, the inspection platform 216 may infer the direction and magnitude of the movements based on measurements generated by a motion sensor included in the computing device 200. In other embodiments, movements of the computing device 200 may be determined based on an analysis of spatial information output by the AR framework. Digital images generated by the image sensor 210 may be provided, as input, to the AR framework over the course of a measurement operation as mentioned above. Whenever a digital image is provided to the AR framework as input, the AR framework may generate spatial information, including an estimated spatial position of the computing device 200 when the digital image was generated. Through analysis of these spatial positions estimated by the AR framework, the inspection platform 216 may be able to determine whether the spatial position of the computing device 200 has changed (and therefore, whether the appearance of the digital feature should be altered).

In certain exemplary implementations, the GUI module 224 may also be responsible for generating interfaces that can be presented on the display 206. Various types of information can be presented on these interfaces. For example, information that is calculated, derived, or otherwise obtained by the coordinating module 220 and/or measuring module 222 may be presented on an interface for display to the user. As another example, visual feedback may be presented on an interface so as to indicate to the user whether the measurement operation is being completed properly.

Figure 3:
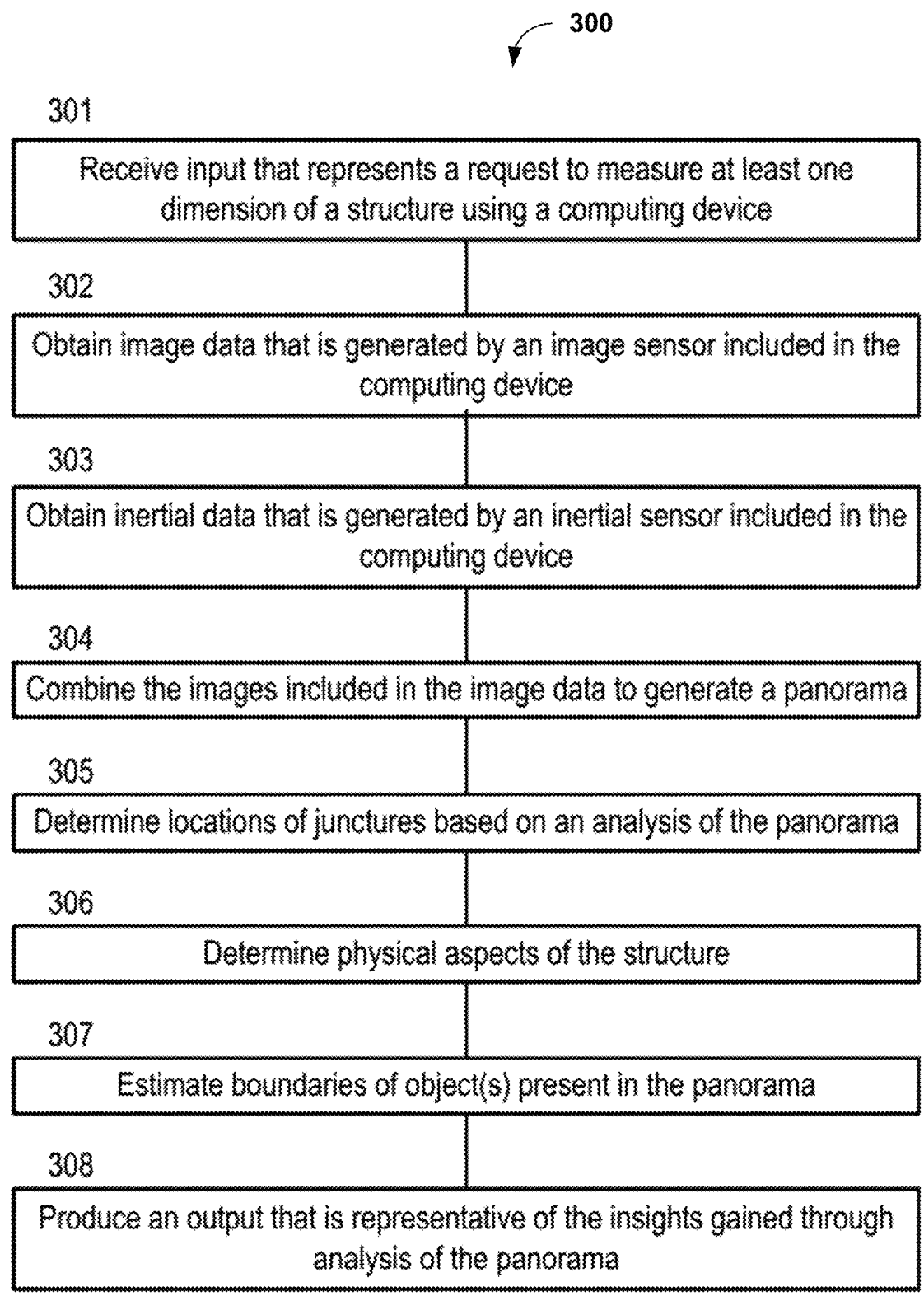
FIG. 3 is a flow diagram of a process 300 for automatically extracting measurements of a structure to enable measurement of arbitrary dimensions, angles, or square footage through analysis of image data and inertial data generated by a computing device, according to an exemplary implementation of the disclosed technology.

FIG. 3 includes a flow diagram of a process 300 for automatically extracting measurements of a structure to enable measurement of arbitrary dimensions, angles, or square footage through analysis of image data and inertial data generated by a computing device. As an example, the process 300 could be used to establish the height, width, and depth of an interior space of a building, an exterior space of the building, or the building itself. Those skilled in art will recognize that the process 300 may be used in the insurance industry for assisting in tasks related to insurance claim processes and/or underwriting processes. However, the process 300 is not limited to the insurance industry, and thus could be utilized in any field or scenario where providing automated measurements of a structure is beneficial.

Initially, an inspection platform may receive input that represents a request to measure at least one dimension of a structure (step 301). Generally, the input is representative of a request to measure a portion of the structure, such as an interior space or exterior space. The input may correspond to a user either initiating (i.e., opening) the inspection platform or interacting with the inspection platform in such a manner so as to indicate that she is interested in measuring the structure. For example, the user may interact with a digital element labeled "Initiate Measuring" or "Begin Measuring" that is viewable on an interface generated by the inspection platform. Alternatively, this input could correspond to an instruction that is provided by either a server system to which the computing device is connected or the computing device itself. For example, the server system may transmit an instruction to initiate the measurement operation to the inspection platform responsive to a determination that certain conditions have been met, the user has indicated a willingness to complete the measurement operation, etc.

The inspection platform may then obtain image data that is generated by an image sensor included in the computing device (step 302). The image data may be representative of digital images of at least a portion of the structure to be measured. These digital images may be representative of static digital images captured in rapid succession by the image sensor, or these digital images may be representative of the frames of a video captured by the image sensor. Preferably, the inspection platform may guide the user through capturing the image data by prompting or provoking the user to alter the spatial position of the computing device as further discussed below.

Moreover, the inspection platform may obtain inertial data that is generated by an inertial sensor included in the computing device (step 303). As mentioned above, the term "inertial sensor" may be used interchangeably with the term "motion sensor." The nature of the inertial data will depend on the nature of the inertial sensor. For example, in embodiments where the inertial sensor is an IMU that includes one or more accelerometers, one or more gyroscopes, one or more magnetometers, or combinations thereof, the inertial data may include a discrete series of measurements in temporal order. Each measurement may indicate a characteristic of motion of the computing device. For example, the measurements may indicate rotational velocity and/or acceleration of the computing device over an interval of time corresponding to generation of the image data.

It is to be appreciated that the generation of image data and inertial data may be performed simultaneously by the computing device. As further discussed below, the temporal relationship between the image data and inertial data may allow the inspection platform to gain information regarding the spatial position of the computing device with respect to the structure.

In accordance with certain exemplary implementations of the disclosed technology, the inspection platform may combine, based on the inertial data, the different digital images included in the image data to create a panorama of at least a portion of the structure (step 304). For the purpose of illustration, the processes herein may be described in the context of "panoramas;" however, those skilled in the art will recognize that the processes may be similarly applicable to digital images that are not wide-angle representations of a structure. As an example, the inspection platform may employ algorithms that are designed to combine or "stitch" the different digital images together so as to create an equirectangular projection of the structure. Certain implementations of the disclosed technology may form a 3D representation of the structure imaged based on the various different motion/pattern/positions/angles for which the digital images are captured. Thus, the term "panorama" may not be necessary applicable for the guided motions that are not pure "panning" of the camera, but rather, that may include circular, square, or other predetermined or computed patterns of movement.

In accordance with certain exemplary implementations of the disclosed technology, the inspection platform may determine the location of junctures of the structure (step 305) utilizing the panorama and/or other guided movement image capture of at least a portion of the structure. For example, the inspection platform may utilize multiple digital images (panoramas or otherwise) to identify the locations of junctures that are representative of floor-wall, ceiling-wall, or wall-wall boundaries. Moreover, the inspection platform may utilize such images compute, infer, or otherwise establish characteristics of other physical features of the structure. For example, the inspection platform may be able to determine the curvature of the surfaces—namely, the walls, ceilings, or floors—that make up the structure. Thus, in accordance with various embodiments, the algorithms executed by the inspection platform may preferably operate on the multiple images to determine the locations of structural intersections like junctures. After determining the location of the junctures of the structure, the inspection platform can determine structural aspects (also referred to as "physical aspects") of the structure (step 306). For example, the inspection platform may determine the location of all walls, ceilings, and floors in a physical space by combining its knowledge of juncture locations and surface curvature.

In some embodiments, the inspection platform may further be configured to estimate the boundaries of some or all of the objects that are present in the multiple digital images (step 307). When identifying the boundaries of objects contained in the multiple digital images, the inspection platform may identify salient objects (e.g., fixtures, appliances, furniture, animals) that are present. The boundaries of a given object could be identified, for example, by estimating the 3D dimensions of aspects present in the imaged portion of the structure and then using those aspects for reference. The dimensions (and measurements of aspects of the structure) may be estimated to a scale factor for consistency purposes. The final scaled values may be regressed relative to the distance between the computing device and ground. Additionally, or alternatively, the final scaled values may be regressed relative to the sizes of the salient objects identified in the panorama (and/or multiple digital images (and therefore, present in the structure). As part of the measurement operation, the inspection platform may also be configured to geographically label—a process referred to as "geo-tagging"—one or more aspects of the structure or the salient objects contained therein.

The inspection platform can then produce an output that is representative of the information gained through analysis of the multiple digital images and/or panorama (step 308). For example, the inspection platform may automatically extract measurements of a structure to enable measurement of arbitrary dimensions, angles, square footage, etc., through analysis of image data and inertial data generated by a computing device. In certain exemplary implementations, the height, width, and/or depth of an interior space may be measured/extracted with the inspection platform.

As an example, the inspection platform may generate a manipulable 3D image that is presented by the computing device for display to the user. The manipulable 3D image may depict user- or platform-selected dimensions estimated for the structure, or the salient objects contained therein. The manipulable 3D image may be generated by combining the determined physical aspects of the structure with the multiple digital images and/or panorama, so as to enable the user to manipulate the 3D image relative to a selected viewing angle. Measurements determined by the inspection platform (e.g., through analysis of the digital images) can be overlaid on the manipulable 3D image, utilizing the estimated object boundaries that are present in the image(s). To permit manipulation, the interface on which the 3D image is presented may be a "point-and-click interface" that is responsive to selections made by the user. For example, the user may be permitted to identify additional measurements to be generated by selecting one or more locations within the bounds of the 3D image. These location(s) may be associated with physical aspects of the structure, or these location(s) may be associated with a salient object contained in the structure.

In accordance with certain exemplary implementations of the disclosed technology, the inspection platform may generate and provides an overlay on the manipulable 3D image that is meant to controllably guide the user through the image data capture process. As further discussed below, the overlay may include one or more digital features that are intended to prompt or provoke movement of the computing device in a predetermined manner (e.g., to ensure the structure or salient objects therein are adequately imaged). Additionally, or alternatively, visual indicia may be provided on the interface to indicate determined structural damage relating to physical aspects of the structure. In certain exemplary implementations, a process of determining the physical aspects of the structure (such as discussed above with reference to step 306) may utilize the inspection platform to determine that a given physical aspect is abnormal in appearance. This can be accomplished by determining (e.g., based on an output produced by a computer vision model) that the given physical aspect is dissimilar from other physical aspects of the same type. This abnormality may be indicative of damage to the given physical aspect. In such a situation, a visual indicium (e.g., a bounding box or digital element in a certain color) may be provided on the interface to identify the abnormality. This may be accomplished by the inspection platform to visually identify the risks, hazards, features, or material types that are associated with internal and external spaces. Examples of risks and hazards for interior spaces include exposed wires, presence of animals, issues related to water heaters, presence or absence of non-combustible materials, wood-burning stoves, issues related to plumbing, mold, water damage (e.g., stains), issues related to washing machines, presence or absence of vacant rooms, issues related to electrical components, and the like. Examples of risks and hazards for exterior spaces include presence of a deck, steps, stairs, porch, or railings, presence of a pool or pool-related features and components, presence of yard-related features and components, presence of propane task, presence of natural features (e.g., lakes, ponds, or streams) in proximity to a structure, condition of exterior portion of a structure, signage associated with a structure, presence of cages or enclosures for animals, presence of boarded ingress points (e.g., doors and windows), presence of clutter or debris, type of structure (e.g., whether the structure is a mobile or modular home), presence of tarps (e.g., on the roof), presence of bars (e.g., on the doors or windows), and the like.

The types of objects contained in a structure may depend on the nature of the structure. If, for example, the imaged portion of the structure is an interior space, then the structure may be of a bathroom with corresponding fixtures, a kitchen with corresponding fixtures, a laundry room with corresponding fixtures, a common area with associated fixtures, a utility closet with associated fixtures, etc. However, the imaged portion of the structure is an exterior space, the structure may include construction materials used for exterior construction, outbuildings (e.g., garages and playscapes), yard components (e.g., water features and garden features), exterior components (e.g., faucets, gutters, and condensate drain lines), etc.

Figure 4:
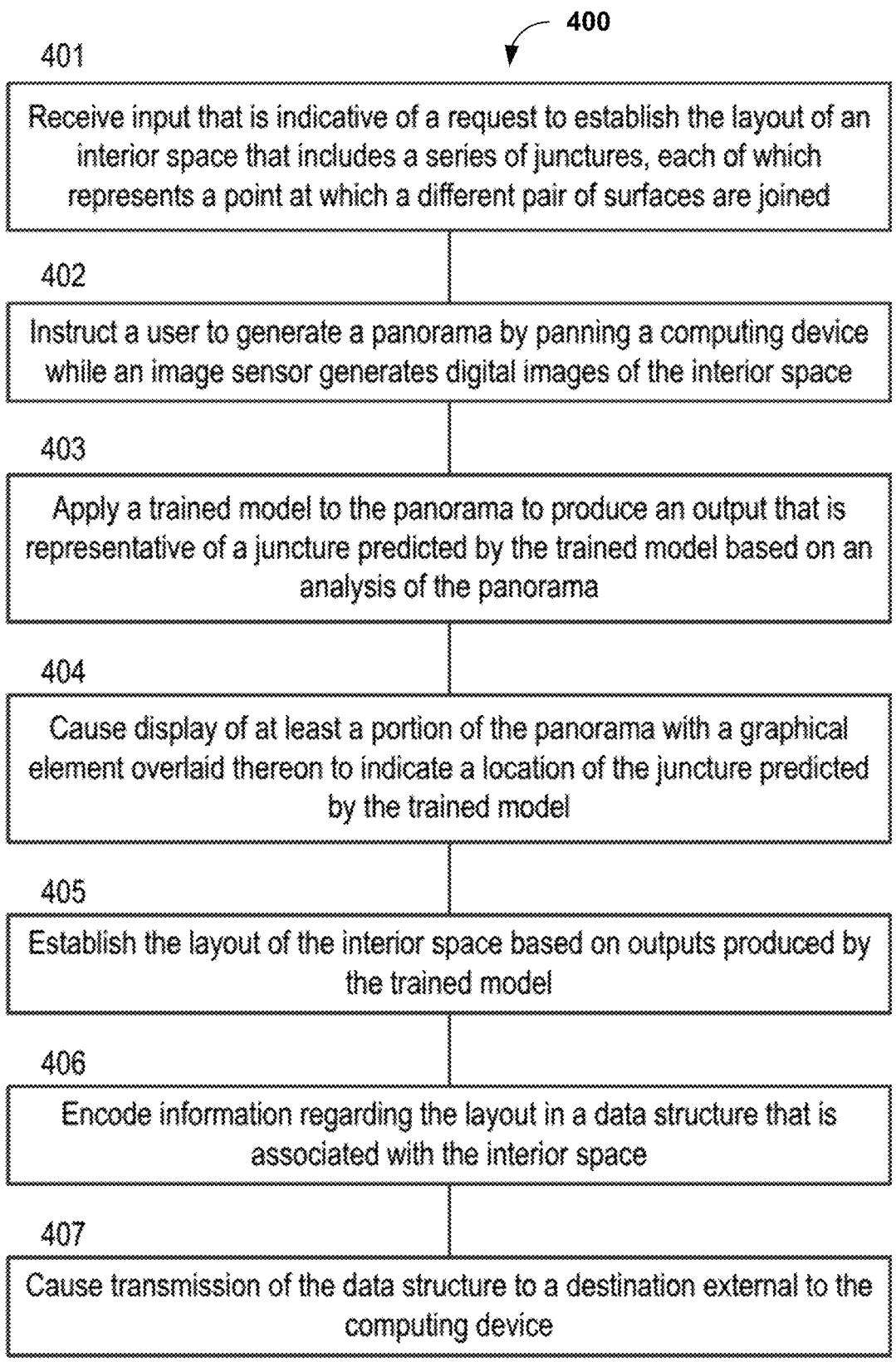
FIG. 4 is a flow diagram of a process 400 for facilitating a guided operation for measuring an interior space of a structure using an inspection platform that is executing on a computing device, according to an exemplary implementation of the disclosed technology.

FIG. 4 includes a flow diagram of a process 400 for facilitating a guided operation for measuring an interior space of a structure using an inspection platform that is executing on a computing device. As discussed above, the processes herein may be described in the context of "panoramas;" however, those skilled in the art will recognize that the processes may be similarly applicable to digital images that are not wide-angle representations of a structure but may include 3D representations of the structure imaged based on the various different motion/pattern/positions/angles for which the digital images are captured. Thus, the term "panorama" may not be necessary applicable for the guided motions that are not pure "panning" of the camera, but rather, that may include circular, square, or other predetermined or computed patterns of movement.

While the process 400 is described in the context of an interior space, those skilled in the art will recognize that aspects of the process 400 may be similarly appliable to modeling an exterior space. Initially, the inspection platform may receive input that is indicative of a request to establish the layout of an interior space that includes a series of junctures, each of which represents a point at which a different pair of surfaces are joined (step 401). Step 401 of FIG. 4 may be substantially similar to step 301 of FIG. 3.

In some embodiments, a user may be able to indicate whether she is interested in establishing a 2D or 3D layout of the interior space. If the user is interested in establishing a 2D layout of the interior space, the inspection platform may only catalogue, store, or otherwise record information regarding wall-wall boundaries. Conversely, if the user is interested in establishing a 3D layout of the interior space, the inspection platform may catalogue, store, or otherwise record information regarding floor-wall, ceiling-wall, and wall-wall boundaries.

The inspection platform may instruct the user to generate a "panorama" (or other multi-image representation) by panning or otherwise moving the computing device in a guided pattern while an image sensor generates one or more digital images of the interior space (step 402). In the case of generating a panorama, the computing device may generate at least two digital images of the interior space and then combine or "stitch" those images together. Accordingly, the panorama may be representative of multiple digital images with overlapping portions that are joined together—usually by the operating system of the computing device—to collectively represent the interior space.

The inspection platform may apply a trained model to the captured images and/or panorama to produce an output that is representative of a juncture predicted by the trained model based on an analysis of the captured images and/or panorama (step 403). Further information regarding models that are trained to identify junctures can be found in U.S. patent application Ser. No. 17/401,912 filed 13 Aug. 2021 and issued as U.S. Pat. No. 11,507,713 on Nov. 22, 2022, which is incorporated by reference herein in its entirety. The trained model may output a matrix in which each entry indicates whether the corresponding pixel corresponds to a juncture. If an entry indicates that the corresponding pixel does correspond to a juncture, the value may also indicate the type of juncture (e.g., whether the juncture is representative of a floor-wall, ceiling-wall, or wall-wall boundary). With these values, the inspection platform may be able to define the juncture, for example, by identifying which pixels correspond to the juncture.

In certain exemplary implementations, the inspection platform may cause display of at least a portion of the "panorama" with a graphical element overlaid thereon to indicate a location of the juncture that is predicted by the trained model (step 404). In accordance with certain exemplary implementations of the disclosed technology, a series of outputs produced by the trained model, each of which is representative of a separate juncture that is predicted by the trained model based on an analysis of the captured images.

Figure 5:
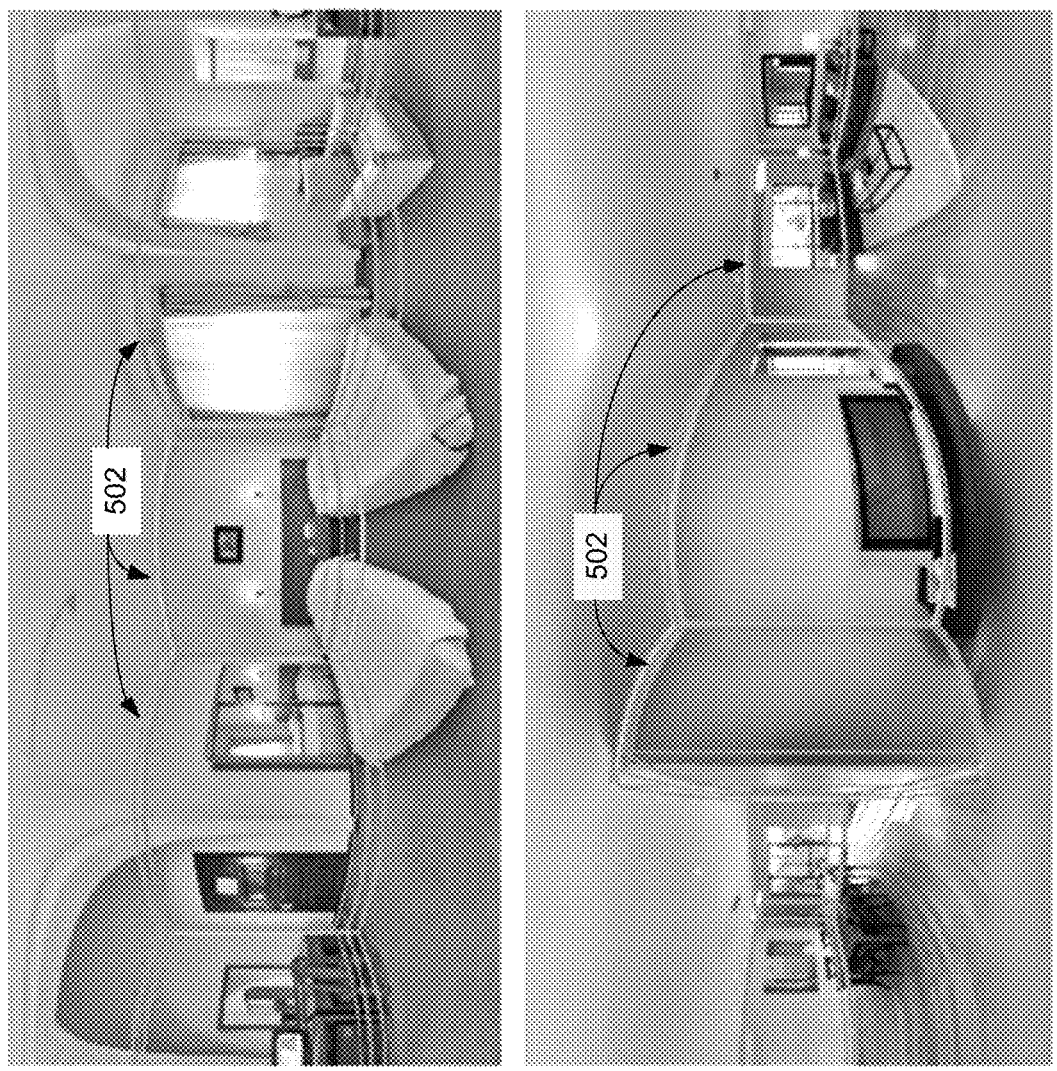
FIG. 5 illustrates how each juncture of an imaged room may be represented using lines that overlay a panorama image according to an exemplary implementation of the disclosed technology.

FIG. 5 illustrates how each juncture of an imaged room may be represented using lines that overlay a panorama image according to an exemplary implementation of the disclosed technology. While each juncture may be represented using a line that overlays the panorama, the panorama may have one or more bounding boxes 502 overlaid thereon. Each bounding box 502 may have four sides, namely, a first side that is representative of the floor-wall boundary, a second side that is representative of the ceiling-wall boundary, and third and fourth sides that are representative of wall-wall boundaries. In a spatial sense, the first and second sides are normally roughly parallel to one another and roughly orthogonal to the third and fourth sides. However, the bounding box 502 may not be rectangular due to the distortion of the panorama. As can be seen in FIG. 5, the bounding boxes 502 that define the walls of an interior space tend to "bulge" along at least one side.

Returning to FIG. 4, the inspection platform may also be able to establish the layout of the interior space based on the outputs produced by the trained model (step 405). As mentioned above, the outputs may be representative of junctures that are predicted by the trained model based on an analysis of the panorama. For each juncture, the inspection platform may infer, predict, or otherwise establish a spatial position in the context of a coordinate system (e.g., defined with respect to the interior space). With these spatial positions, the inspection platform can determine the layout of the interior space. Thereafter, the inspection platform may encode information regarding the layout in a data structure that is associated with the interior space (step 406). For example, the inspection platform may encode the spatial positions of the junctures, the dimensions of the walls, the height of the ceiling, etc. The data structure is normally stored in a memory that is internal to the computing device on which the inspection platform is executing. However, the inspection platform could alternatively or additionally cause transmission of the data structure to a destination external to the computing device (step 407). For example, the data structure could be transmitted to another computing device (e.g., server system 108 of FIG. 1) to which the computing device is communicatively connected.

Figure 6:
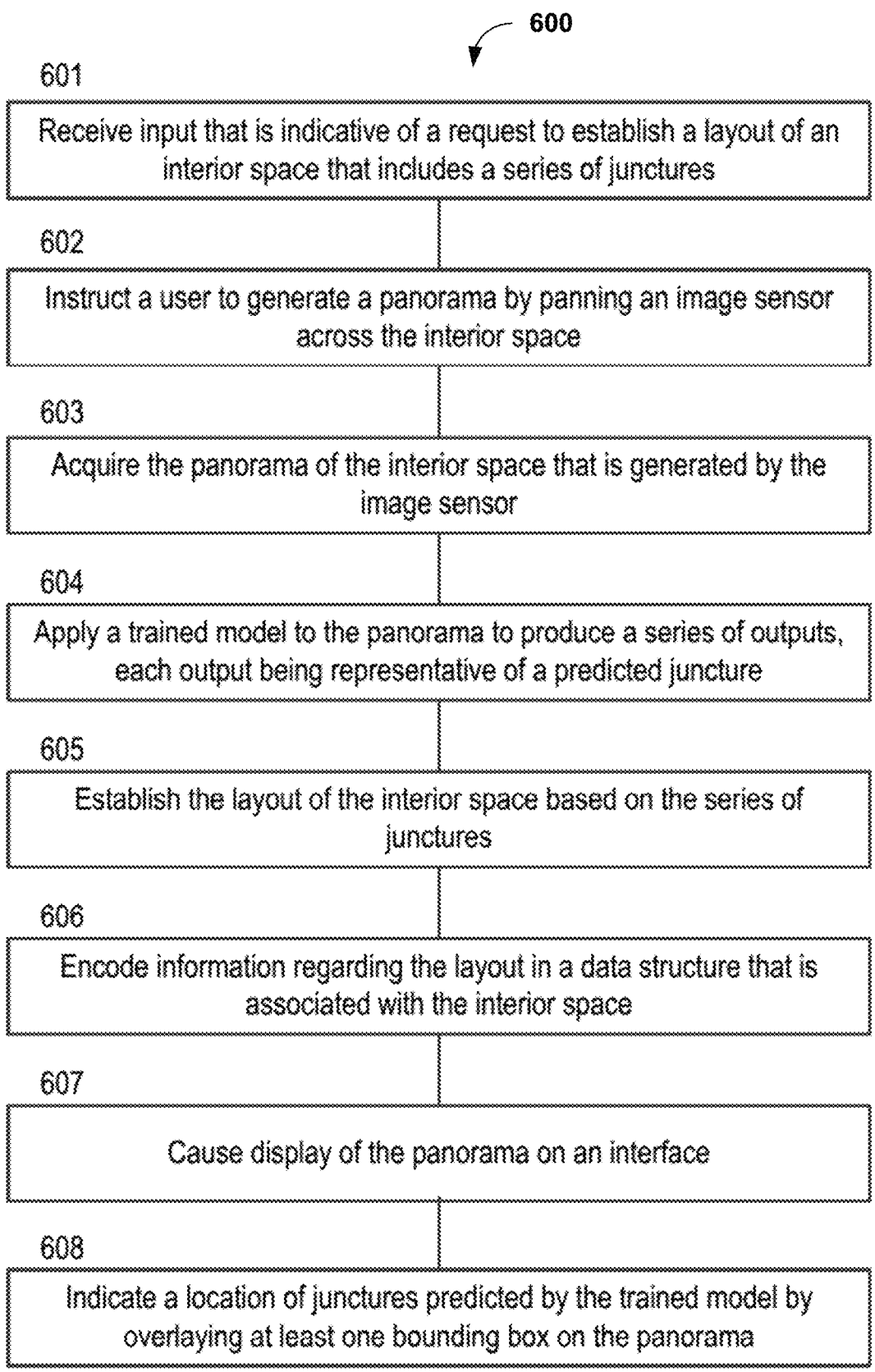
FIG. 6 is a flow diagram of another process 600 for facilitating a guided procedure for modeling an interior space using an inspection platform that is executing on a computing device, according to an exemplary implementation of the disclosed technology.

FIG. 6 includes a flow diagram of another process 600 for facilitating a guided procedure for modeling an interior space using an inspection platform that is executing on a computing device. Again, while the process 600 is described in the context of an interior space, aspects of the process 600 may be similarly appliable to modeling an exterior space. As discussed above, the term "panorama" as used herein, may be generalized to include other representations of a structure or space based on multiple digital images that may be captured via any guided pattern of the camera.

Initially, the inspection platform may receive input that is indicative of a request from a user to establish the layout of an interior space that includes a series of junctures (step 601), each of which represents a point at which a different pair of surfaces are joined. As an example, consider a rectangular room that may include four 90-degree corners. Such a rectangular room will include various junctures of different types such as four wall-wall boundaries at which different pairs of walls join together. Along each wall, there may also be a floor-wall boundary and a ceiling-wall boundary. Together, these various junctures may define the periphery of the interior space from a 3D perspective.

In certain exemplary implementations, the inspection platform may instruct the user to generate a "panorama" by a guided movement, which can include panning an image sensor across the interior space or may include any other guided pattern (step 602). This can be accomplished using the camera housed in a computing device that is associated with the user. In some embodiments the inspection platform may reside on the computing device, while in other embodiments the inspection platform may reside on another computing device to which the computing device is communicatively connected. In certain embodiments where the inspection platform resides on the computing device associated with the user, the inspection platform may configure a capture session so that the multiple images and/or panorama is made available by the operating system after being generated by the camera. For instance, the inspection platform may cause the capture session to be customized by configuring a capture parameter of the camera based on a characteristic of the interior space. As an example, the resolution, focus, or flash could be altered based on the ambient light level, distance to wall, location in interior space, etc. These characteristics of the interior space may be determined based on an output produced by a sensor included in a sensor suite (e.g., sensor suite 212 of FIG. 2) of the computing device.

The inspection platform may then acquire the panorama and/or multiple digital images from different positions/angles of the interior space via the image sensor (step 603). In certain implementations where the inspection platform resides on the computing device that was used to capture the images, the inspection platform may obtain the images directly from the operating system. Alternatively, the inspection platform may receive the images from across a network (e.g., via communication module 208 of FIG. 2). Thereafter, the inspection platform can apply a trained model to the images to produce a series of outputs (step 604). Each output in the series of outputs may be representative of a juncture that is predicted by the trained model based on an analysis of the images. The trained model may be configured to perform pixel-wise classification of pixel data corresponding to the images in a columnar manner to produce the series of outputs.

In some embodiments, the inspection platform may establish the layout of the interior space based on the series of outputs (step 605). For example, the inspection platform may calculate the dimensions of the interior space based on the series of outputs and then create a 2D floor plan for the interior space that is based on the dimensions. As another example, the inspection platform may calculate the dimensions of the interior space based on the series of outputs and then create a 3D floor plan for the interior space that is based on the dimensions. Whether the floor plan is 2D or 3D may depend on the type(s) of junctures that are predicted by the inspection platform. Moreover, the inspection platform can encode information regarding the layout in a data structure that is associated with the interior space (step 606). Step 606 of FIG. 6 may be substantially similar to step 406 of FIG. 4.

In accordance with certain exemplary implementations, the inspection platform may be configured to provide feedback to the user during the capture session in which the panorama and/or multiple digital images is/are captured.

For example, the inspection platform may cause display of the panorama on an interface (step 607) and then indicate a location of each juncture that is predicted by the trained model by overlaying at least one bounding box on the panorama (step 608). As shown in FIG. 5, the perimeter of each bounding box 502 is typically defined by a set of four outputs. Normally, the set of four outputs includes a first output representing a floor-wall boundary, a second output representing a ceiling-wall boundary, and third and fourth outputs representing different wall-wall boundaries. In some embodiments, steps 607-608 are performed in near real time. Thus, bounding boxes 502 may be overlaid on the panorama as the image sensor is panned across the interior space (and the panorama is presented on the display of the computing device). In other embodiments, steps 607-608 are performed after the panorama is generated. For example, steps 607-608 may be performed by the inspection platform in response to receiving input indicative of a selection of the panorama by the user.

As another example, the inspection platform may cause display of the image data on the computing device in real time (i.e., as the image data is generated) and then overlay a digital feature on the image data. As further discussed below, the digital feature may be intended to prompt or provoke movement of the computing device, for example, by instructing the user to cause manipulation of the digital feature by moving the computing device.

As discussed above, digital images may be generated of a structure of interest over the course of a measurement operation. Examples of structures include the floor, ceiling, and walls of the interior space, as well as obtained contained therein such as furniture. Accordingly, if a user is interested in measuring a wall of an interior space, then the user may use their computing device to generate digital images of the wall as discussed above. Similarly, if a user is interested in documenting an object contained in an interior space, then the user may use their computing device to generate digital images of the object as discussed above.

While better coverage of the structure—in terms of the amount that is imaged—is generally desirable, there are several notable advantages. First, accuracy in estimating measurements can be improved if the structure is more fully imaged. Second, a more holistic understanding of the structure (e.g., in terms of its locations, condition, etc.) can be established if the structure if more fully imaged.

As discussed above, one way to improve coverage is to have the user reposition the computing device as digital images of the structure are generated. Having the user reposition the computing device is not a trivial task, however. When instructed to reposition a computing device, many users tend to either (i) reorient the computing device (e.g., from the vertical orientation to the horizontal orientation, or vice versa) or (ii) move the computing device along an axis that extends orthogonally from the roughly vertical plane along which the computing device is oriented. That is, users tend to position the computing device further or nearer their bodies, thereby changing the spatial position of the computing device without altering its perspective of the structure. Thus, in certain embodiments of the disclosed technology, the AR engine or framework may be used to determine whether or not the use is capturing images from multiple spatial positions that include lateral translation. In certain exemplary implementations, the overlay to guide the user during the image capture process may be generated based on such determination, for example, to prompt the user to move the image capture device in a more advantageous pattern.

Figure 7B:
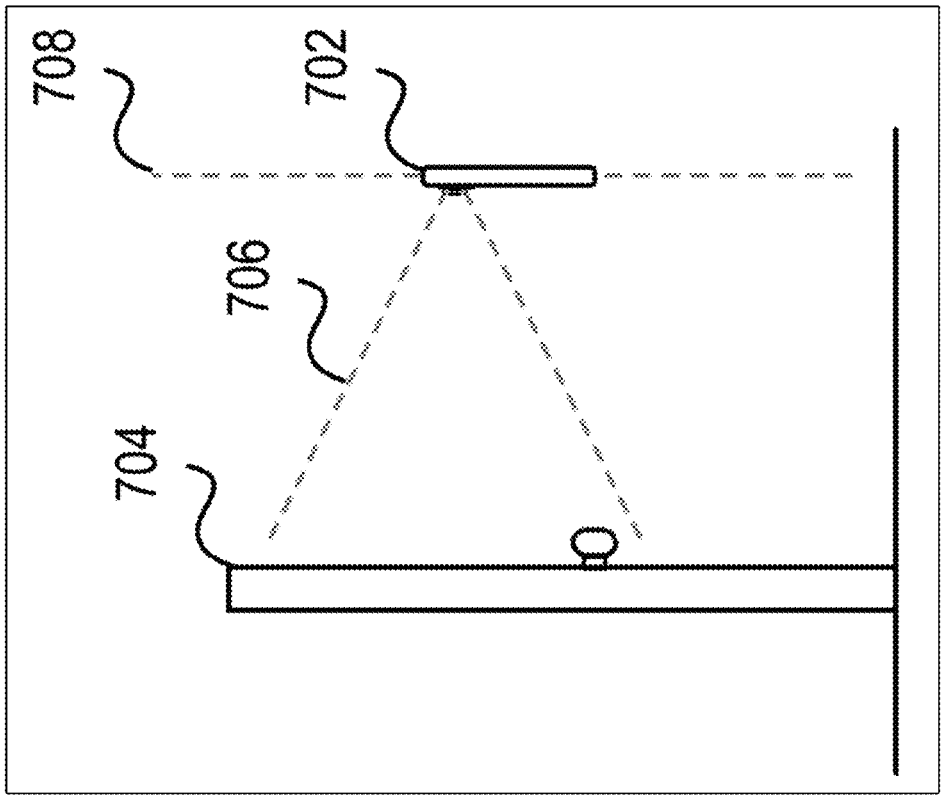
FIG. 7B is a side-view illustration of the process illustrated in FIG. 7A, according to an exemplary implementation of the disclosed technology.
Figure 7A:
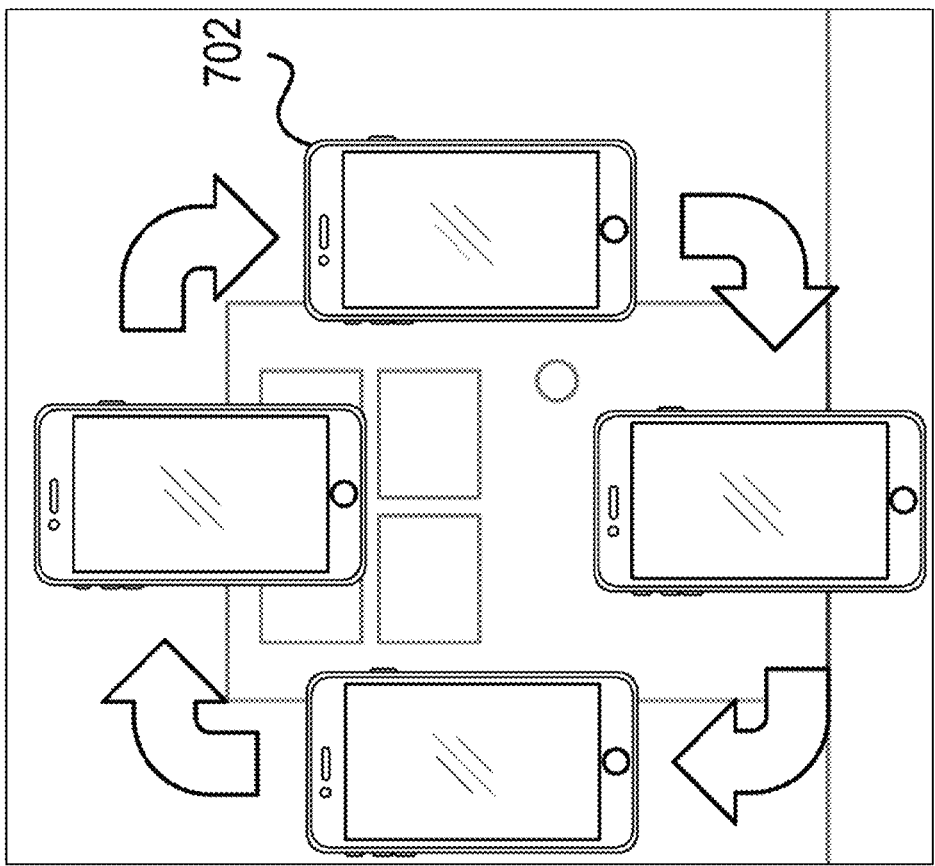
FIG. 7A is a user-view illustration of a process for imaging a structure in an improved manner by having the user adjust the spatial position of the computing device as digital images are generated, according to an exemplary implementation of the disclosed technology.

FIG. 7A is a user-view illustration of a process for imaging a structure in an improved manner by having the user adjust the spatial position of the computing device as digital images are generated, according to an exemplary implementation of the disclosed technology. FIG. 7B is a side-view illustration of the process illustrated in FIG. 7A, according to an exemplary implementation of the disclosed technology. To gain greater coverage of the structure, the inspection platform can prompt a user to move the computing device as digital images of the structure are generated. FIGS. 7A and 7B illustrate how a structure (here, a door 704) can be imaged in an improved manner by having the user adjust the spatial position of the computing device 702 as digital images are generated. In FIG. 7A, the computing device 702 is illustrated moving in a clockwise manner so as to move the field of view 706 of its image sensor, though the movement need not necessarily be in the clockwise manner. The direction in which the computing device 702 is moved is generally based on how the user is provoked or prompted as discussed below.

In certain exemplary implementations, the computing device 702 may be moved parallel to the roughly vertical plane 708 along which the computing device is oriented. As an example, referring again to FIG. 7A, the computing device 702 may be moved in the clockwise direction along the vertical plane 708. Generally, movement that is orthogonal to the vertical plane 708 may not be desirable as such movement may simply narrow or widen the view of the structure. However, movement along multiple dimensions may be acceptable. As an example, if the user moves the computing device along the dashed line that represents the upper boundary of the field of view 706 of the image sensor, that movement may be permitted since the computing device is moving vertically in addition to horizontally.

Figure 8:
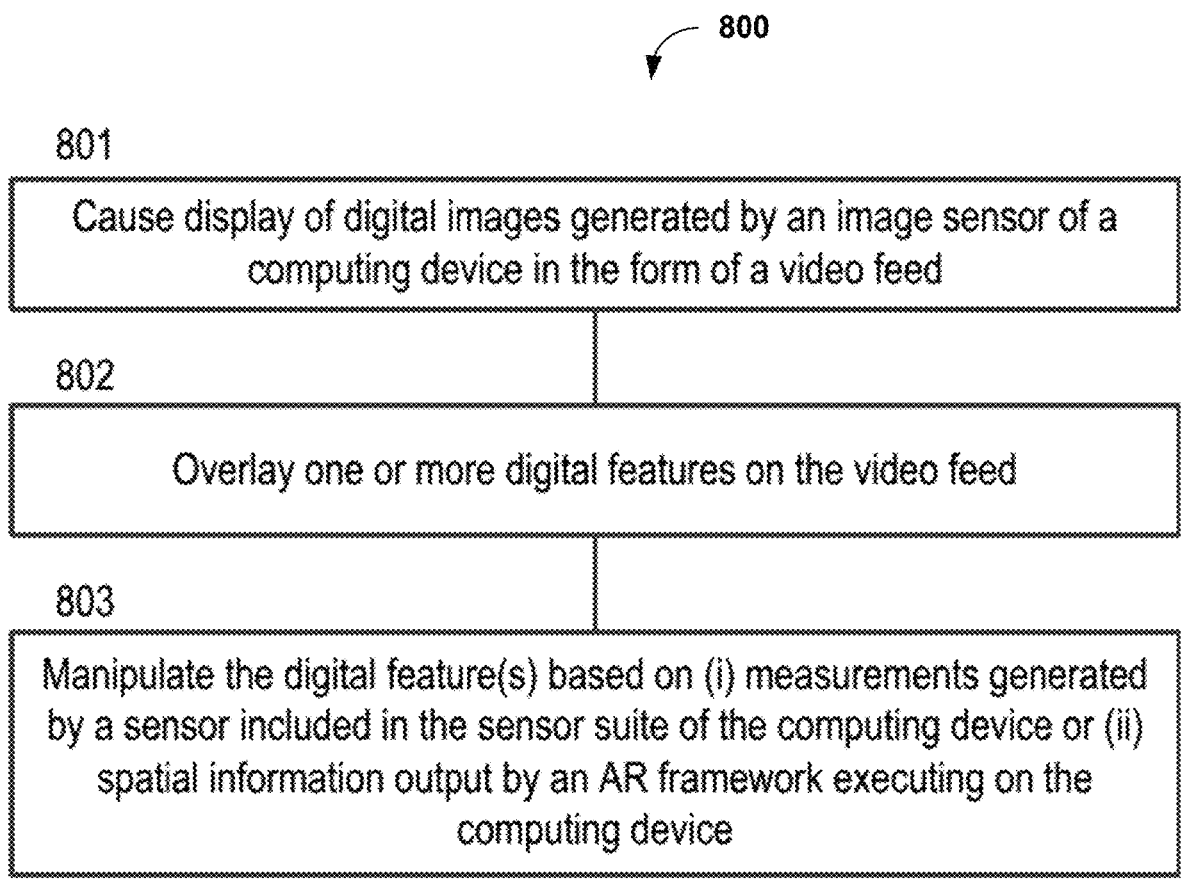
FIG. 8 is a flow diagram of a process 800 for prompting a user to reposition their computing device as digital images are generated of a structure of interest, according to an exemplary implementation of the disclosed technology.

FIG. 8 includes a flow diagram of a process 800 for prompting a user to reposition the computing device as digital images are generated of a structure of interest. Generally, this process 800 is performed as part of a guided measurement operation. Accordingly, the process 800 could be performed in conjunction with the processes 300, 400, 600 of FIGS. 3, 4, and 6. As an example, the process 800 could be performed as part of step 602 of FIG. 6.

As part of the guided measurement operation of a structure, an inspection platform may cause digital images of the structure to be generated. These digital images can be presented for display in the form of a video feed (step 801). Assume that the user has indicated an interest in measuring the structure, for example, by submitting input indicative of a request to measure the structure through an interface generated by the inspection platform. In such a scenario, the user may be instructed to orient the computing device so that the structure is within the field of view of its image sensor. As digital images are generated by the image sensor, those digital images can be presented on the display of the computing device in the form of a video feed.

The inspection platform may overlay one or more digital features on the video feed (step 802). In some embodiments, a single digital feature may be overlaid on the video feed. In other embodiments, multiple digital features may be overlaid on the video feed. Further details regarding digital features are provided below, though at a high level, presentation of the digital feature(s) is intended to prompt the user to reposition the computing device in a predetermined, predictable manner.

Characteristics of the digital feature(s) may be varied based on the structure, physical space in which the structure is located, computing device, intended application of the digital images, position of the computing device camera during capture, or any combination thereof. For example, the dimensions of the digital feature(s) could be adjusted in order to vary the amount of the physical space surrounding the structure that is imaged. As another example, the sensitivity of the digital feature(s) to movement of the computing device could be adjusted in order to vary the amount of the physical space surrounding the structure that is imaged. For instance, if the appearance of the digital feature(s) is varied based on movements of the computing device, then the inspection platform may make the digital feature(s) less responsive to the movements if greater coverage is desired (as the user will need to move the computing device a greater amount in order to provoke variation in the appearance).

To provoke or prompt movement of the computing device, the inspection platform may vary the appearance of the digital feature(s) based on movements of the computing device. The inspection platform may manipulate the appearance of the digital feature(s) based on (i) measurements generated by a sensor included in the sensor suite of the computing device or (ii) spatial information output by an AR framework executing on the computing device (step 803). Each of these options is discussed below.

In certain exemplary implementations, the inspection platform may obtain measurements that are generated by a sensor included in the sensor suite 212 of the computing device 200 over the course of a guided measurement operation. As discussed above with reference to FIGS. 2 and 3, these measurements can be used to better understand the digital images captured/generated by the image sensor. The inspection platform may also use these measurements to infer the direction and magnitude of movements of the computing device. For example, the inspection platform may parse inertial data generated by an inertial sensor (or position sensor) to discover patterns of measurements indicative of movement and then vary the appearance of the digital feature(s) based on the inferred movement.

Additionally, or alternatively, the inspection platform may examine spatial information generated by the AR framework executing on the computing device. As digital images are generated by the image sensor, the digital images can be provided to the AR framework as input. The AR framework can produce, as output, spatial information that specifies spatial positions of the computing device with respect to a defined coordinate system. Accordingly, for each digital image, the computer program may obtain a spatial position of the computing device as determined by the AR framework. By monitoring the spatial positioned determined for the computing device over time, the disclosed technology may be utilized to establish whether the computing device is being repositioned (and therefore, whether the appearance of the digital feature(s) should be varied).

While the process 800 is described in the context of a guided measurement operation, those skilled in the art will recognize that the process 800 may be similarly applicable even if no measurements are to be generated. Thus, the process 800 could be implemented as part of a guided imaging operation where different structures are imaged, for example, for the purpose of documenting the condition of an interior space and its contents.

Figure 9:
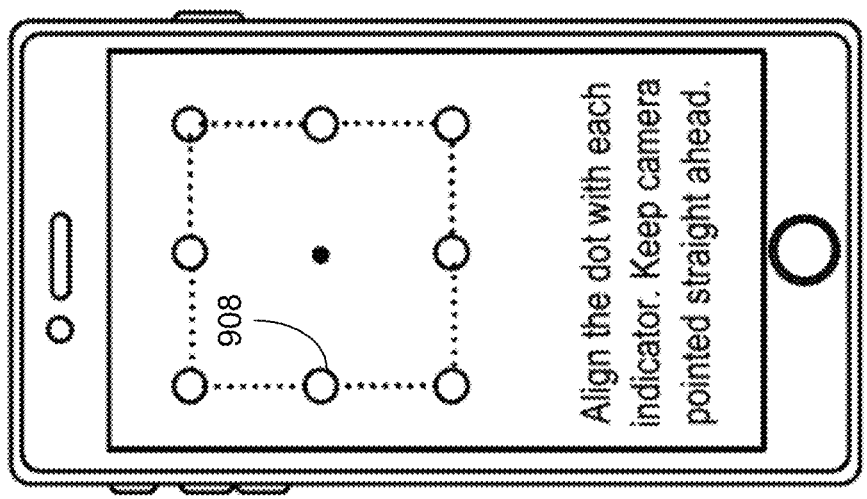
FIG. 9 illustrates three examples of digital features and instructions that may be overlaid on a video feed of a computing device to provoke or prompt movement of the computing device during capture of images, according to an exemplary implementation of the disclosed technology.
Figure 9:
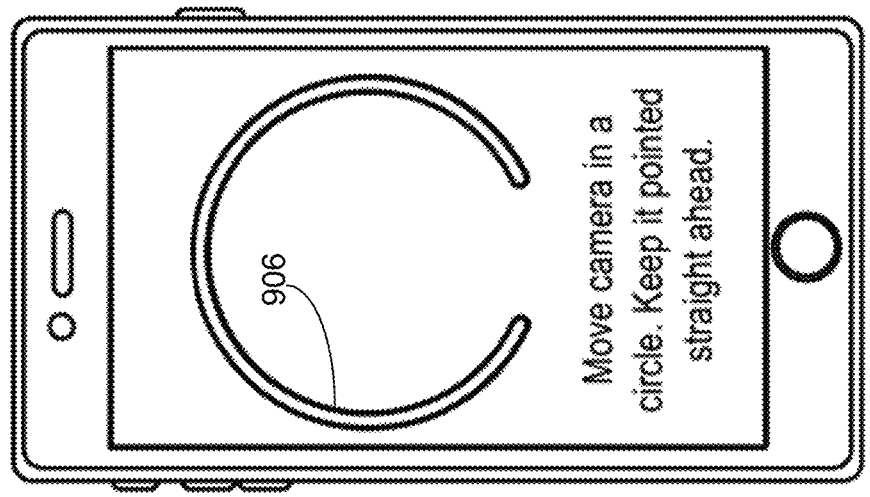
Figure 9:
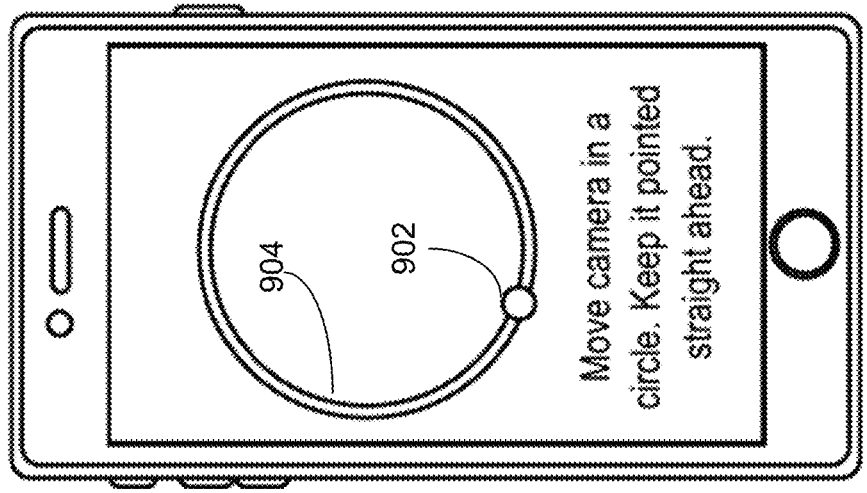

FIG. 9 illustrates three examples of digital features and instructions that may be overlaid on a video feed of a computing device to provoke or prompt movement of the computing device during capture of images, according to an exemplary implementation of the disclosed technology. FIG. 9 includes illustrations of how digital features may be overlaid on the video feed so as to provoke or prompt movement of the computing device. These examples are provided for the purpose of illustration, and these examples are not intended to be limiting. The design and number of digital features populated onto the video feed can vary based on several factors. For example, the size, placement, and sensitivity to movement of the digital features may be based on the amount of coverage that is desired. If greater coverage of a structure is desired, then the appearance of the digital feature may be less sensitive to movements of the computing device. Additionally, or alternatively, the size of the digital feature may be increased if greater coverage of the structure is desired. As illustrated the left-most example of FIG. 9, and according to certain example implementations, the dot 902 may move around the circle 904 as the computing device moves in the requested manner. As illustrated in the center example of FIG. 9, the bar 906 may fill as the computing device moves in the requested manner. As illustrated the right-most example of FIG. 9, the dots 908 may change in appearance (e.g., be filled in, replaced with another digital element, etc.) when the computing device moves in the requested manner.

While embodiments may be described in the context of digital features that are generally circular in nature—or provoke generally circular movement of the computing device along a vertical plane—the digital features could be in the form of, or arranged in, any suitable geometric shape or pattern. For example, digital features could be arranged in a semi-circle, line, square, rectangle, triangle, or some other shape. Nearly any geometric shape or pattern may be suitable, so long as the digital features provoke movement of the computing device and ensure sufficient coverage in terms of imaging.

FIGS. 10A-F illustrate an exemplary workflow of an assisted capture procedure in which a user may be visually prompted to adjust the position of the computing device so that a structure of interest (a door in this case) can be sufficiently imaged, according to an exemplary implementation of the disclosed technology.

FIGS. 10G-L illustrate another exemplary workflow (similar to the workflow illustrated in FIGS. 10A-F) of an assisted capture procedure in which a user may be visually prompted to adjust the position of the computing device so that a structure of interest (a table in this case) can be sufficiently imaged, according to an exemplary implementation of the disclosed technology. The digital images that are generated over the course of the assisted capture procedure may be used to provide a comprehensive view of the structure or gain insight into the structure (e.g., its dimensions, condition, location, etc.).

Figure 10A:
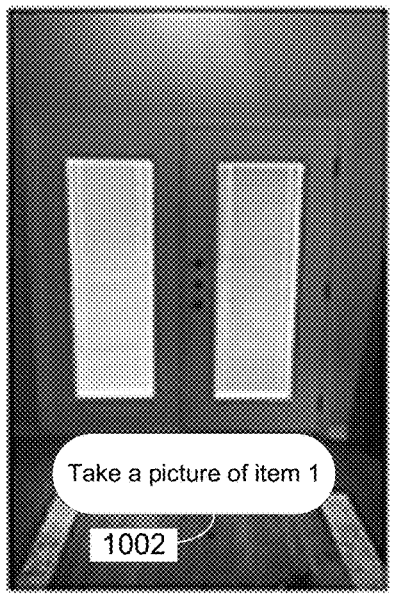
FIGS. 10A-F illustrate an exemplary workflow of an assisted capture procedure in which a user is visually prompted to adjust the position of the computing device so that a structure of interest (a door in this case) can be sufficiently imaged, according to an exemplary implementation of the disclosed technology.

As shown in FIG. 10A, the user may initially be prompted with an overlaid instructions 1002 to locate a structure of interest (here, a set of doors) within the field of view of the image sensor of the computing device. In some embodiments, the user may indicate that the structure is presently being imaged, for example, by interacting with the computing device (e.g., tapping the screen if the display is touch sensitive). In other embodiments, the inspection platform may determine that the structure is presently being imaged. For example, the inspection platform may examine digital images generated by the image sensor in real time to determine whether the structure is included therein. As another example, the inspection platform may examine data generated by another sensor to determine whether the values indicate that the structure is presently being imaged. If the sensor is in inertial sensor, then the inspection platform may parse the data to determine whether there is a pattern of values indicating that the computing device is being held steady in one position.

Figure 10B:
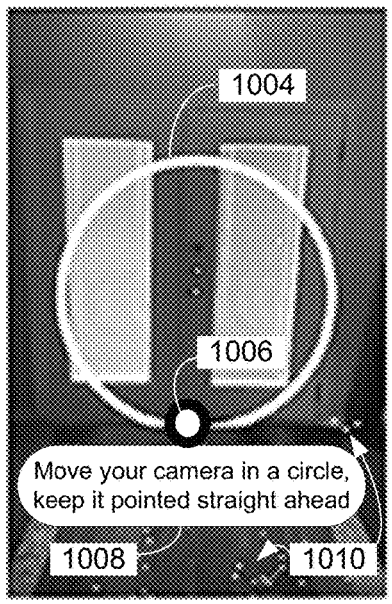
Figure 10C:
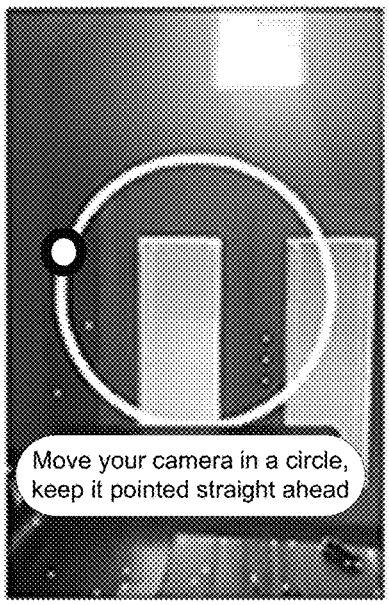
Figure 10D:
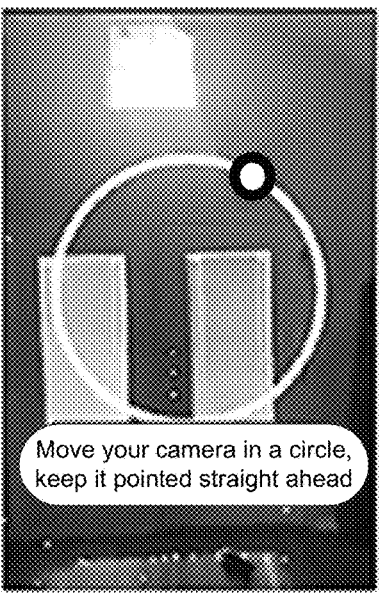
Figure 10E:
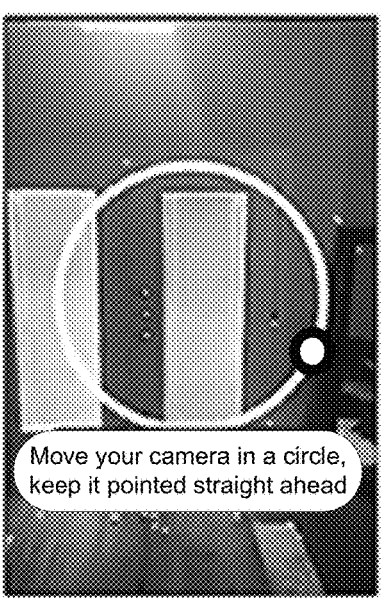

The inspection platform can then overlay one or more digital elements 1004 on the video feed as shown in FIG. 10B. An instruction 1008 may accompany the digital element(s) in some embodiments. Here, for example, the user is instructed to move the image sensor in a circle, keeping it pointed straight ahead. As the user moves the computing device in the requested manner, the inspection platform can manipulate the appearance of the digital element(s). For example, the dot 1006 may travel around the circle as the user moves the computing device along a vertical plane as shown in FIGS. 10C-10F.

Other digital features could also be overlaid on the video feed. In FIGS. 10 B-F, for example, small dots 1010 that are representative of spatial positions determined by the AR framework may also be overlaid on the video feed. Showing these small dots 1010 may be helpful as it indicates live feedback to the user about how the AR framework is determining additional spatial positions due to the additional imaging of the structure.

Figure 10F:
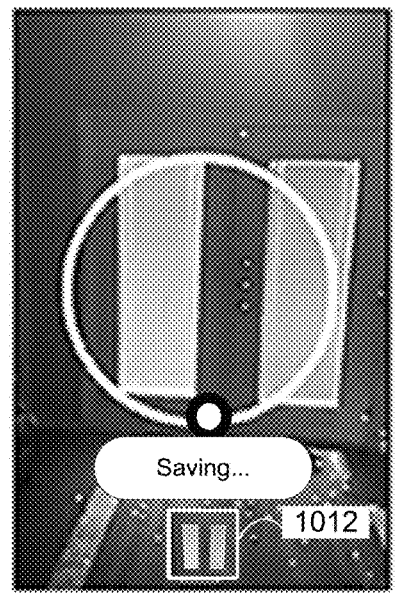
Figure 10G:
FIGS. 10G-L illustrate another exemplary workflow (similar to the workflow illustrated in FIGS. 10A-F) of an assisted capture procedure in which a user is visually prompted to adjust the position of the computing device so that a structure of interest (a table in this case) can be sufficiently imaged, according to an exemplary implementation of the disclosed technology.
Figure 10H:
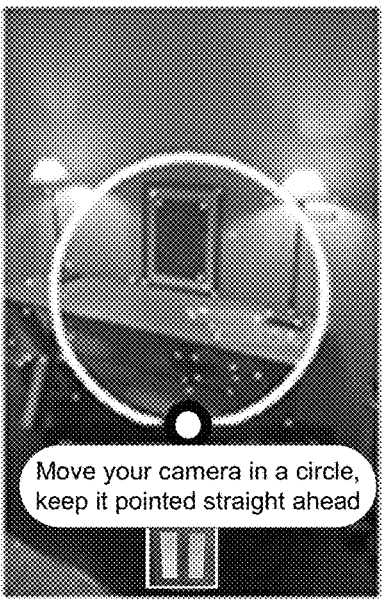
Figure 10I:
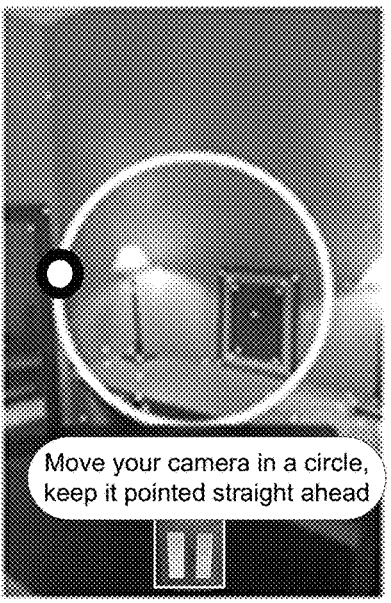
Figure 10J:
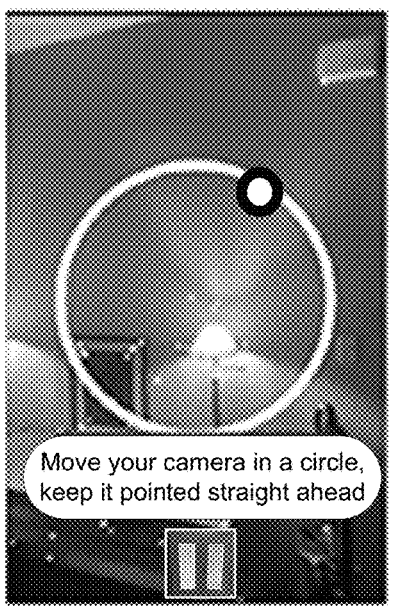
Figure 10K:
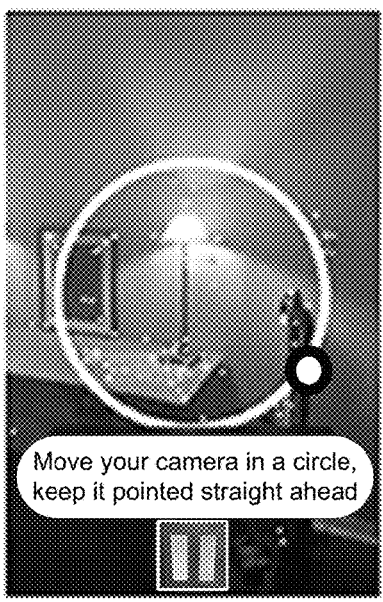
Figure 10L:
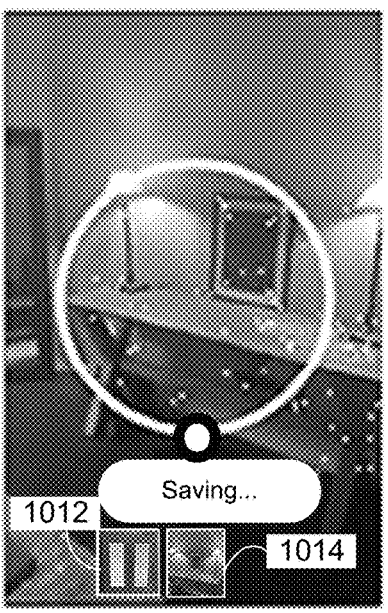

In accordance with certain exemplary implementations of the disclosed technology, once the structure of interest has been imaged according to the overlay instructions, a small thumbnail 1012 of the imaged structure may generated and overlaid over the video feed to indicate that the structure has been properly imaged, as illustrated in FIG. 10F.

FIGS. 10 G-L illustrate how the same assisted capture procedure (as described above with reference to FIGS. 10A-F) may be used for another structure (here, a table) that is located in the same a physical space. In accordance with certain exemplary implementations of the disclosed technology, once the structure of interest has been imaged according to the overlay instructions, another small thumbnail 1014 of the imaged structure may generated and overlaid over the video feed, for example, next to the previous thumbnail 1012, to indicate that the structure has been properly imaged. Other indicator may be utilized or the size of the thumbnails 1012 1014 may be scaled as to not obstruct or interfere with subsequent imaging of additional structures.

Figure 11:
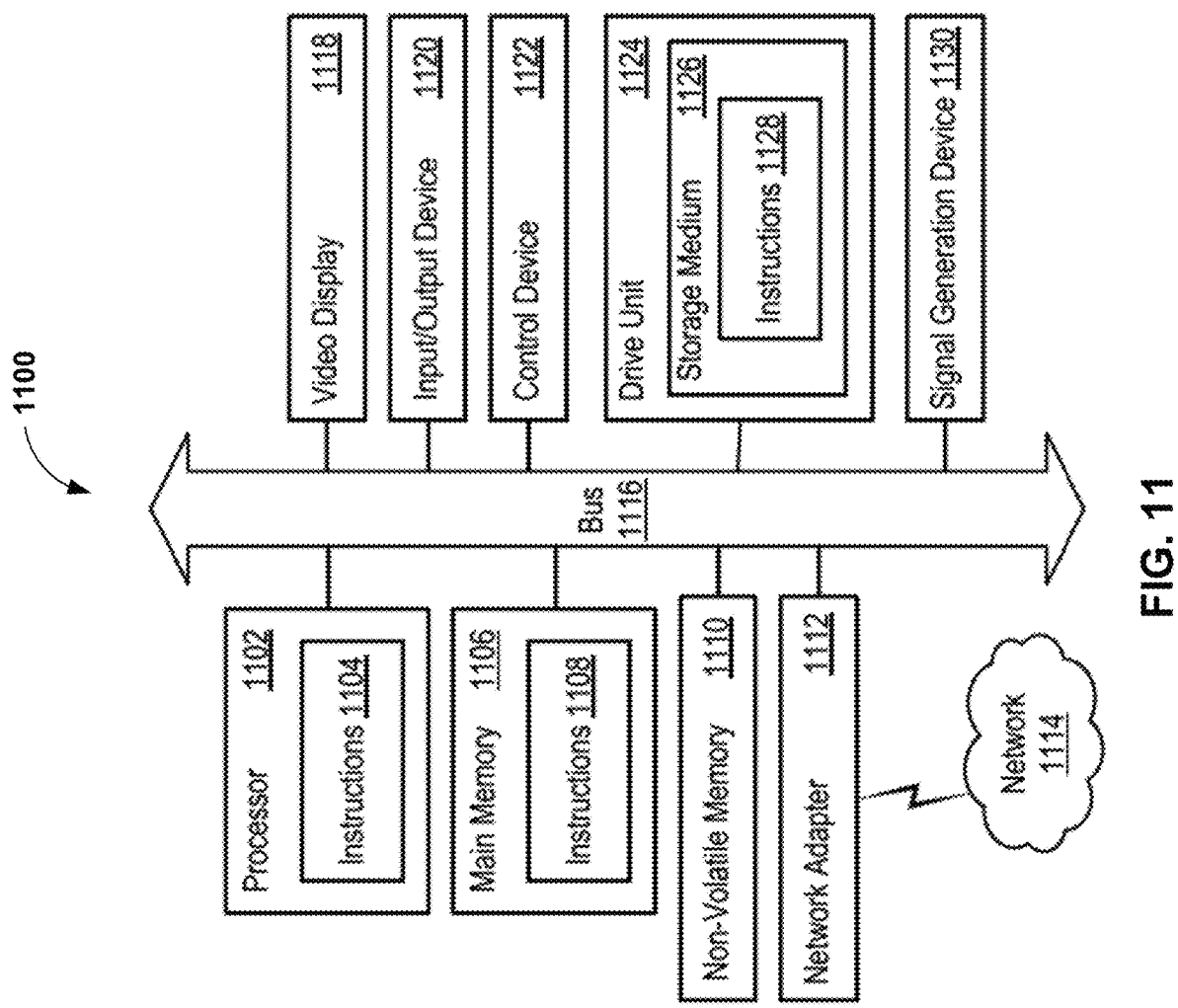
FIG. 11 is a block diagram illustrating an example of a processing system 1100 in which at least some operations described herein may implemented in accordance with certain exemplary implementations of the disclosed technology.

FIG. 11 is a block diagram illustrating an example of a processing system 1100 in which at least some operations described herein can be implemented. For example, components of the processing system 1100 may be hosted on a computing device that includes an inspection platform, or components of the processing system 1100 may be hosted on a computing device with which images of an interior space are captured.

The processing system 1100 may include a central processing unit ("processor") 1102, main memory 1106, non-volatile memory 1110, network adapter 1112, video display 1118, input/output device 1120, control device 1122 (e.g., a keyboard or pointing device), drive unit 1124 including a storage medium 1126, and signal generation device 1130 that are communicatively connected to a bus 1116. The bus 1116 is illustrated as an abstraction that represents one or more physical buses or point-to-point connections that are connected by appropriate bridges, adapters, or controllers. The bus 1116, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), inter-integrated circuit ($I^2C$) bus, or an Institute of Electrical and Electronics Engineers (IEEE) standard 1394 bus (also referred to as "Firewire").

While the main memory 1106, non-volatile memory 1110, and storage medium 1126 are shown to be a single medium, the terms "machine-readable medium" and "storage medium" should be taken to include a single medium or multiple media (e.g., a centralized/distributed database and/or associated caches and servers) that store one or more sets of instructions 1128. The terms "machine-readable medium" and "storage medium" shall also be taken to include any medium that is capable of storing, encoding, or carrying a set of instructions for execution by the processing system 1100.

In general, the routines executed to implement the embodiments of the disclosure may be implemented as part of an operating system or a specific application, component, program, object, module, or sequence of instructions (collectively referred to as "computer programs"). The computer programs typically comprise one or more instructions (e.g., instructions 1104, 1108, 1128) set at various times in various memory and storage devices in a computing device. When read and executed by the processors 1102, the instruction(s) cause the processing system 1100 to perform operations to execute elements involving the various aspects of the present disclosure.

Further examples of machine- and computer-readable media include recordable-type media, such as volatile memory devices and non-volatile memory devices 1110, removable disks, hard disk drives, and optical disks (e.g., Compact Disk Read-Only Memory (CD-ROMS) and Digital Versatile Disks (DVDs)), and transmission-type media, such as digital and analog communication links.

The network adapter 1112 may enable the processing system 1100 to mediate data in a network 1114 with an entity that is external to the processing system 1100 through any communication protocol supported by the processing system 1100 and the external entity. The network adapter 1112 can include a network adaptor card, a wireless network interface card, a router, an access point, a wireless router, a switch, a multilayer switch, a protocol converter, a gateway, a bridge, bridge router, a hub, a digital media receiver, a repeater, or any combination thereof.

Figure 12:
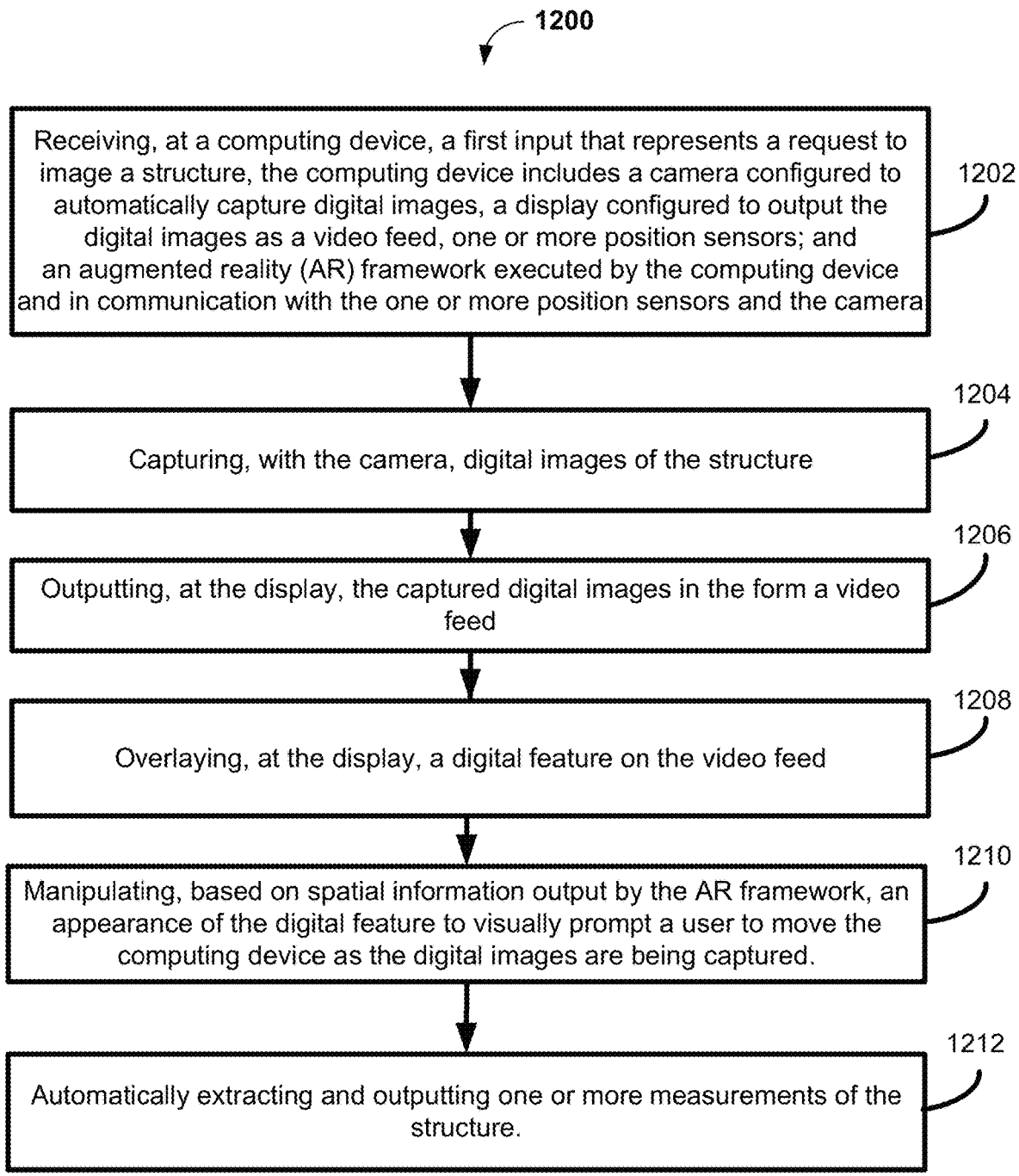
FIG. 12 is a flow diagram of a method 1200 for facilitating a guided movement with live feedback for capturing digital images using an augmented reality (AR) framework executing on a computing device, according to an exemplary implementation of the disclosed technology.

FIG. 12 is a flow diagram of a method 1200 for facilitating a guided movement with live feedback for capturing digital images using an augmented reality (AR) framework executing on a computing device, according to an exemplary implementation of the disclosed technology. In block 1202, the method 1200 includes receiving, at a computing device, a first input that represents a request to image a structure. The computing device computing device includes a camera configured to automatically capture digital images, a display configured to output the digital images as a video feed, one or more position sensors, and an augmented reality (AR) framework executed by the computing device and in communication with the one or more position sensors and the camera. In block 1204, the method 1200 includes capturing, with the camera, digital images of the structure. In block 1206, the method 1200 includes outputting, at the display, the captured digital images in the form a video feed. In block 1208, the method 1200 includes overlaying, at the display, a digital feature on the video feed. In block 1210, the method 1200 includes manipulating, based on spatial information output by the AR framework, an appearance of the digital feature to visually prompt a user to move the computing device as the digital images are being captured. In block 1212, the method 1200 includes automatically extracting and outputting one or more measurements of the structure.

In certain exemplary implementations, the measurements can include one or more of dimensions and angles.

In certain implementations, manipulating the appearance of the digital feature can include generating a prompt to visually guide the user to laterally translate the computing device as the digital images are being captured.

According to an exemplary implementation of the disclosed technology, automatically extracting the measurements can include analysis of image data of the digital images by the AR framework and inertial data generated by the one or more position sensors.

In certain exemplary implementations, manipulating the appearance of the digital feature can include outputting, on the display, instructions to prompt the user to move the computing device in a predetermined manner.

In certain exemplary implementations, manipulating the appearance of the digital feature can include outputting, on the display, live feedback to prompt the user to adjust movement of the computing device as the digital images are being captured.

In certain exemplary implementations, the one or more position sensors can include one or more of an accelerometer and a gyroscope.

In certain implementations, the display can include a graphical user interface.

In some implementations, the structure may be located in an interior space

Certain exemplary implementations of the disclosed technology can further include receiving, at the mobile computing device, a second input that represents a confirmation that the structure is being imaged by the camera, wherein the capturing is initiated responsive to the second input.

In certain exemplary implementations, the computing device is a smartphone or a tablet.

In some implementations, the computing device may include or be associated with a drone.

In certain exemplary implementations, the spatial information includes spatial coordinates, each of which is indicative of a spatial position of the computing device when a corresponding digital image was captured, and wherein the AR framework produces the corresponding spatial position as output for each captured digital image.

In the foregoing description, references to "an embodiment" or "certain embodiments" mean that the feature, function, structure, or characteristic being described is included in at least one embodiment. Occurrences of such phrases do not necessarily refer to the same embodiment, nor are they necessarily referring to alternative embodiments that are mutually exclusive of one another.

The term "based on" is to be construed in an inclusive sense rather than an exclusive sense. That is, in the sense of "including but not limited to." Thus, unless otherwise noted, the term "based on" is intended to mean "based at least in part on."

The terms "connected," "coupled," and variants thereof are intended to include any connection or coupling between two or more elements, either direct or indirect. The connection or coupling can be physical, logical, or a combination thereof. For example, elements may be electrically or communicatively coupled to one another despite not sharing a physical connection.

The term "module" may refer broadly to software, firmware, hardware, or combinations thereof. Modules are typically functional components that generate one or more outputs based on one or more inputs. A computer program may include or utilize one or more modules. For example, a computer program may utilize multiple modules that are responsible for completing different tasks, or a computer program may utilize a single module that is responsible for completing all tasks.

When used in reference to a list of multiple items, the word "or" is intended to cover all of the following interpretations: any of the items in the list, all of the items in the list, and any combination of items in the list.

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling those skilled in the relevant art to understand the claimed subject matter, the various embodiments, and the various modifications that are suited to the particular uses contemplated.

Although the Detailed Description describes certain embodiments and the best mode contemplated, the technology can be practiced in many ways no matter how detailed the Detailed Description appears. Embodiments may vary considerably in their implementation details, while still being encompassed by the specification. Particular terminology used when describing certain features or aspects of various embodiments should not be taken to imply that the terminology is being redefined herein to be restricted to any specific characteristics, features, or aspects of the technology with which that terminology is associated. In general, the terms used in the following claims should not be construed to limit the technology to the specific embodiments disclosed in the specification, unless those terms are explicitly defined herein. Accordingly, the actual scope of the technology encompasses not only the disclosed embodiments, but also all equivalent ways of practicing or implementing the embodiments.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

What is claimed is:

1. A method, comprising:
    receiving, at a computing device, a first input that represents a request to image a structure, wherein the computing device comprises:
        a camera configured to automatically capture digital images;
        a display configured to output the digital images as a video feed;
        one or more position sensors configured to determine a direction and magnitude of movements of the computing device; and
        an augmented reality (AR) framework executed by the computing device and in communication with the one or more position sensors and the camera;
    capturing, with the camera, digital images of the structure;
    outputting, at the display, the captured digital images in a form of a video feed;
    overlaying, at the display, a digital feature on the video feed during the capturing;
    manipulating, based on spatial information output by the AR framework, an appearance of the digital feature to visually prompt a user to move the computing device as the digital images are being captured for capturing additional areas or perspectives of the structure and to vary an amount of physical space surrounding the structure that is imaged, wherein the manipulating the appearance of the digital feature comprises outputting, on the display, live feedback to prompt the user to adjust movement of the computing device as the digital images are being captured, wherein the manipulating the appearance of the digital feature is less responsive as the computing device is moved a greater amount to provoke variation in the appearance while capturing additional areas or perspectives of the structure; and
    automatically extracting and outputting one or more measurements of the structure by temporally aligning the digital images with the direction and magnitude determined by the one or more position sensors.

2. The method of claim 1, wherein manipulating the appearance of the digital feature comprises visually prompting the user to laterally translate the computing device as the digital images are being captured.

3. The method of claim 1, wherein the measurements comprise one or more of dimensions and angles.

4. The method of claim 1, wherein the automatically extracting the measurements comprises analysis of image data of the digital images by the AR framework and inertial data generated by the one or more position sensors.

5. The method of claim 1, wherein the manipulating the appearance of the digital feature comprises outputting, on the display, instructions to prompt the user to move the computing device in a predetermined manner.

6. The method of claim 1, wherein the one or more position sensors comprise one or more of an accelerometer and a gyroscope.

7. The method of claim 1, wherein the display comprises a graphical user interface.

8. The method of claim 1, wherein the structure is located in an interior space.

9. The method of claim 1, further comprising receiving, at the computing device, a second input that represents a confirmation that the structure is being imaged by the camera, wherein the capturing is initiated responsive to the second input.

10. The method of claim 1, wherein the computing device is a smartphone or a tablet.

11. The method of claim 1, wherein the computing device comprises a drone.

12. The method of claim 1, wherein the spatial information includes spatial coordinates, each of which is indicative of a spatial position of the computing device when a corresponding digital image was captured, and wherein the AR framework produces the corresponding spatial position as output for each captured digital image.

13. A system, comprising:
    a computing device, comprising:
        a processor,
        memory in communication with the processor;
        a camera configured to automatically capture digital images and store them in the memory;
        a display configured to output the digital images as a video feed;
        one or more position sensors configured to determine a direction and magnitude of movements of the computing device; and
        an augmented reality (AR) framework executed by the computing device and in communication with the one or more position sensors and the camera;
    wherein the computing device is configured to:
        receive a first input that represents a request to image a structure;
        capture, with the camera, digital images of the structure;
        output, at the display, the captured digital images in a form of a video feed;
        overlay, at the display, a digital feature on the video feed during the capture;
        manipulate, based on spatial information output by the AR framework, an appearance of the digital feature to visually prompt a user to move the computing device as the digital images are being captured for capturing additional areas or perspectives of the structure for capturing additional areas or perspectives of the structure and to vary an amount of physical space surrounding the structure that is imaged, wherein the manipulating the appearance of the digital feature comprises outputting, on the display, live feedback to prompt the user to adjust movement of the computing device as the digital images are being captured, wherein the manipulating the appearance of the digital feature is less responsive as the computing device is moved a greater amount to provoke variation in the appearance while capturing additional areas or perspectives of the structure; and
        automatically extract and output one or more measurements of the structure by temporally aligning the digital images with the direction and magnitude determined by the one or more position sensors.

14. The system of claim 13, wherein the spatial information includes spatial coordinates, each of which is indicative of a spatial position of the computing device when a corresponding digital image was captured, and wherein the AR framework is configured to produce the corresponding spatial position as output for each captured digital image.

15. The system of claim 13, wherein the computing device is configured to analyze image data of the digital images by the AR framework and inertial data generated by the one or more position sensors to automatically extract and output the one or more measurements of the structure, wherein the measurements comprise one or more of dimensions and angles.

16. The system of claim 13, wherein the computing device is configured to manipulate the appearance of the digital feature by outputting, on the display, instructions to prompt the user to move the computing device in a predetermined manner including lateral translation.

17. The system of claim 13, wherein the one or more position sensors comprise one or more of an accelerometer and a gyroscope.

18. The system of claim 13, wherein the computing device is a smartphone or a tablet.

19. A non-transitory medium with instructions stored thereon that, when executed by a processor of a computing device, cause the computing device to perform operations comprising:

receiving, at a computing device, a first input that represents a request to image a structure, wherein the computing device comprises:
   a camera configured to automatically capture digital images;
   a display configured to output the digital images as a video feed;
   one or more position sensors; and
   an augmented reality (AR) framework executed by the computing device and in communication with the one or more position sensors and the camera;

capturing, with the camera, digital images of the structure;

outputting, at the display, the captured digital images in a form of a video feed;

overlaying, at the display, a digital feature on the video feed during the capturing;

manipulating, based on spatial information output by the AR framework, an appearance of the digital feature to visually prompt a user to move the computing device as the digital images are being captured for capturing additional areas or perspectives of the structure for capturing additional areas or perspectives of the structure and to vary an amount of physical space surrounding the structure that is imaged, wherein the manipulating the appearance of the digital feature comprises outputting, on the display, live feedback to prompt the user to adjust movement of the computing device as the digital images are being captured, wherein the manipulating the appearance of the digital feature is less responsive as the computing device is moved a greater amount to provoke variation in the appearance while capturing additional areas or perspectives of the structure; and automatically extracting and outputting one or more measurements of the structure by temporally aligning the digital images with a direction and magnitude determined by the one or more position sensors.

* * * * *